(12) United States Patent
Mishima et al.

(10) Patent No.: US 7,619,759 B1
(45) Date of Patent: Nov. 17, 2009

(54) IMAGE FORMING APPARATUS, POWER SUPPLY APPARATUS, AND METHOD OF SUPPLYING POWER

(75) Inventors: Nobuhiro Mishima, Okazaki (JP); Kazuhiro Ishiguro, Toyohashi (JP); Toshiya Shirasawa, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 1979 days.

(21) Appl. No.: 09/585,339

(22) Filed: Jun. 2, 2000

(30) Foreign Application Priority Data

Jun. 4, 1999 (JP) .................................. 11-158657

(51) Int. Cl.
*G06K 15/00* (2006.01)
*G06F 3/12* (2006.01)
*H04N 1/00* (2006.01)
*H04N 1/46* (2006.01)

(52) U.S. Cl. ..................... 358/1.14; 358/1.15; 358/500; 358/400

(58) Field of Classification Search ......... 358/500–505, 358/1.9, 1.14, 1.15, 305, 400, 401, 406, 407, 358/425, 442, 443, 527, 530
See application file for complete search history.

(56) References Cited

U.S. PATENT DOCUMENTS

| | | | | | |
|---|---|---|---|---|---|
| 4,532,418 | A | * | 7/1985 | Meese et al. | 235/381 |
| 5,349,448 | A | * | 9/1994 | Hirai | 358/444 |
| 5,493,409 | A | * | 2/1996 | Maeda et al. | 358/296 |
| 5,694,226 | A | * | 12/1997 | Yokoyama | 358/468 |
| 5,708,821 | A | * | 1/1998 | Takikita | 713/310 |
| 5,757,388 | A | * | 5/1998 | Stephenson | 347/2 |
| 5,805,780 | A | * | 9/1998 | Kawai et al. | 358/1.18 |
| 5,884,086 | A | * | 3/1999 | Amoni et al. | 713/300 |

FOREIGN PATENT DOCUMENTS

| | | |
|---|---|---|
| JP | 06-171188 | 6/1994 |
| JP | 10-271368 | 10/1998 |
| JP | 11-20275 | 1/1999 |

* cited by examiner

*Primary Examiner*—James A Thompson
(74) *Attorney, Agent, or Firm*—McDermott Will & Emery LLP

(57) ABSTRACT

When it is detected that an external device has been connected, the printing unit is controlled so as to form an image according to image data that has been received from the external device. As a result, image forming can be started earlier compared with the case in which image forming is prepared after the image data is transmitted. Accordingly, the user waits a shorter period of time and the usability is improved.

13 Claims, 17 Drawing Sheets

IMAGE FORMING APPARATUS, POWER SUPPLY APPARATUS, AND METHOD OF SUPPLYING POWER

This application is based on an application No. 11-158657 filed in Japan, the content of which is hereby incorporated by reference.

BACKGROUND OF THE INVENTION (1) Field of the Invention

The present invention relates to an image forming apparatus that receives image data from an external device such as a digital camera and forms an image, a power supply apparatus that supplies power to the external device, and a method of supplying power to the external device.

(2) Related Art

With recent widespread use of portable devices that supplies image data such as the digital camera and the PDA (Personal Digital Assistant), there has been a growing desire to print out obtained or received images as soon as possible even away from home. In order to respond to this desire, more and more places such as convenience stores are equipped with image forming apparatuses including printers.

For instance, the image forming apparatus is used in the manner described below. First, the user directly connects a device that provides image data to the image forming apparatus using a fixed cable. Note that the device that provides image data is referred to as an "external device" in this specification.

Then, the user chooses a desired image that is to be printed from a plurality of images that have been obtained by taking pictures, for instance, and transmits the image data of the chosen image to the image forming apparatus using operational buttons on the external device. As a result, image data is transmitted from the external device to the image forming apparatus via no personal computer and the image forming apparatus forms the image on one recording sheet according to the image data that has been transmitted from the external device to prints out the image.

Note that it is desirable to constantly supply power to each of the elements including a fixing unit in the image forming apparatus, and especially desirable to constantly keep the temperature of the fixing roller at a fixing temperature for speedy printing out. For this purpose, however, a large amount of power is wasted by the heater for the fixing roller and the like.

A proposed solution to this problem according to the conventional image forming apparatus is the sleep mode. More specifically, when a certain period of time has elapsed without printing, the sleep mode is applied to stop supplying power to the units including the heater where a relatively large amount of electricity is consumed. When receiving image data from the external device, the image forming apparatus cancels the sleep mode and supplies power to the units.

Meanwhile, the image forming apparatus at the convenience store is equipped with a coin box. According to the amount of money put in the coin box, the number of printings is managed. With such a coin box, the image forming apparatus directly satisfied user needs since the user operates the image forming apparatus without permission of the shop clerk. As a result, printing service at the convenience store and the like can be improved.

Although electricity is saved according to the conventional image forming apparatus, it takes a relatively long time to increase the temperature of the fixing unit to a fixing temperature since the sleep mode is canceled after receiving image data from the external device. As a result, a certain period of time elapsed before printing starts. This is inconvenient for the user.

Meanwhile, in some cases the external device stops working due to insufficient amount of electrical charge of a secondary battery of the external device, for instance, when the user forgot to recharge the battery. As a result, it is desirable that the secondary battery can be recharged away from home, for instance, at the convenience store. The conventional image forming apparatus providing the printing service cannot recharge the secondary battery. This is also inconvenient for the user.

SUMMARY OF THE INVENTION

It is accordingly an object of the present invention to provide an image forming apparatus that requires a shorter period of time that elapses before printing when image data is transmitted from an external device and an image is formed according to the image data and that is more convenient for the user.

Another object of the present invention is to provide an image forming apparatus and a power supply apparatus that recharges the secondary battery and is more convenient for the user.

The above-mentioned first object may be achieved by an image forming apparatus to which an external device transmitting image data is to be connected, the image forming apparatus that includes: a detecting unit for detecting whether the external device has been connected to the image forming apparatus; a printing unit; and a control unit for controlling, when the detecting unit detects that the external device has been connected to the image forming apparatus, the printing unit so as to prepare for image forming according to the image data from the external device.

According to the image forming apparatus, the printing unit prepares for image forming when the external device is connected. As a result, image forming can be started earlier compared with the conventional image forming apparatus in which image forming is prepared after the image data is transmitted. Accordingly, the user waits a shorter period of time and the usability is improved.

The above-mentioned second object may be achieved by one of an image forming apparatus that includes: a power supplying unit for generating power that is to be supplied to an external device transmitting image data; an interface for connecting the external device to the image forming apparatus, wherein the image data from the external device is received via the interface and the power from the power supplying unit is supplied to the external device via the interface; a judging unit for judging whether a charge is to be collected; a printing unit; a control unit for controlling power supplying by the power supplying unit and image forming by the printing unit according to a judging result from the judging unit, wherein the control unit has the printing unit form an image according to the image data from the external device that has been received via the interface and a power supply apparatus that supplies power to an external device that transmits image data comprising: a power supplying unit for generating the power that is to be supplied to the external device; a connector for connecting the external device to the power supply apparatus, wherein the image data from the external device is received via the connector and the power from the power supplying unit is supplied to the external device via the connector; a printing unit for forming an image according to the image data from the external device that has been received via the connector; and a charge collecting unit for collecting a charge for an amount of the power that has been supplied to the external device.

According to the image forming apparatus, image data from the external device is received via the interface and power from the power supplying unit is supplied to the external device via the interface. As a result, an image is formed according to the received image data and the secondary battery of the external device can be recharged. Accordingly, the image forming apparatus is more convenient for the user compared with the conventional one.

According to the power supply apparatus, image data from the external device is received via the connector and power from the power supplying unit is supplied to the external device via the connector. As a result, an image is formed according to the received image data and the secondary battery of the external device can be recharged. Accordingly, the power supply apparatus is more convenient for the user compared with the conventional one.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings.

DESCRIPTION OF THE PREFERRED EMBODIMENT

Here, an explanation of the preferred embodiment of an image forming apparatus according to the present invention used in a color printer (referred to as a "printer" in this specification) will be given with reference to the figures.

Figure 1:
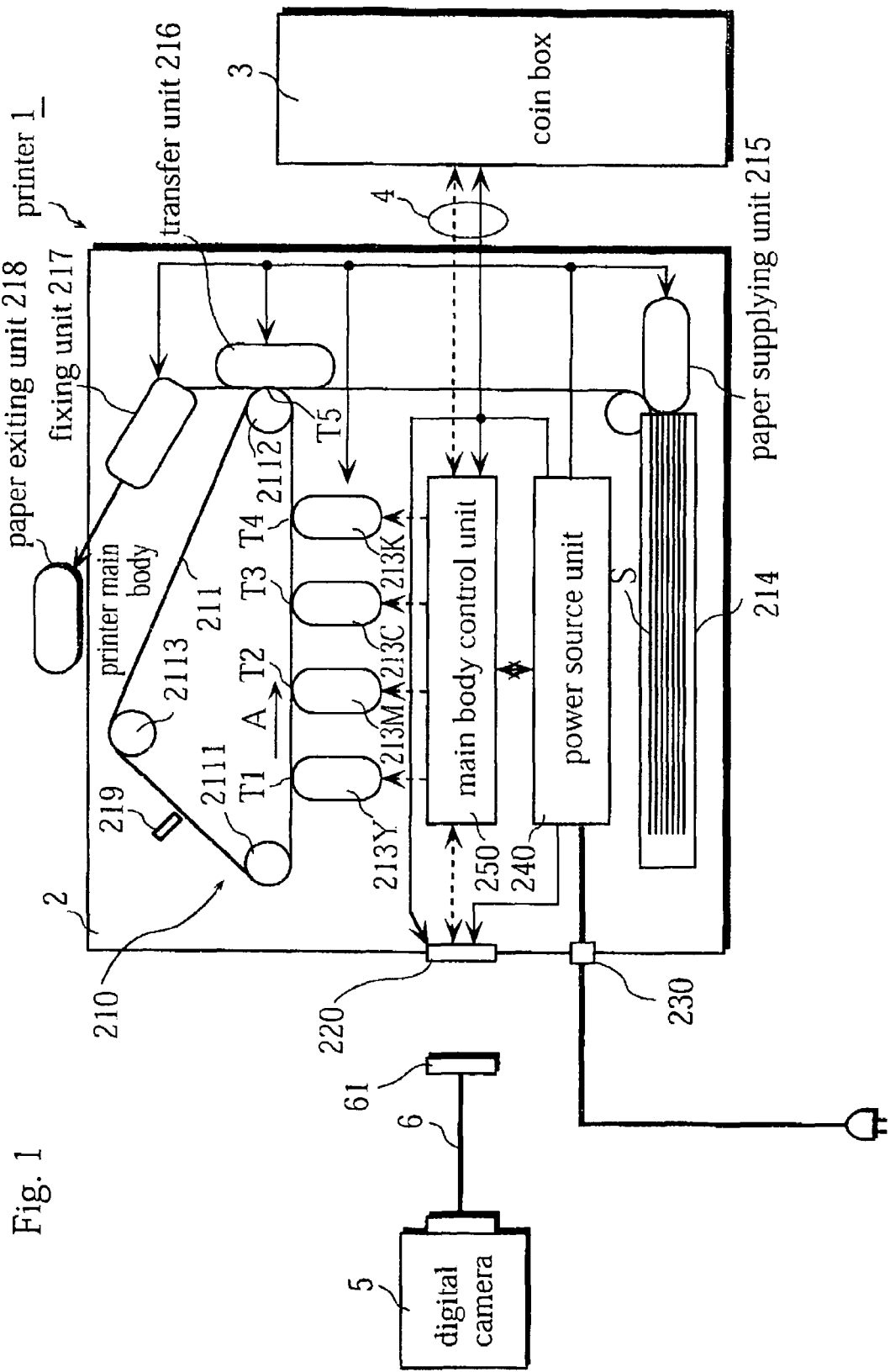
FIG. 1 shows an overall construction of a printer according to the preferred embodiment of the present invention.

FIG. 1 shows an overall construction of a printer 1 according to the present embodiment. FIG. 1 shows that a digital camera 5 is connected to the printer 1 via a cable 6. Note that the digital camera 5 is driven by a secondary battery, records the image that has been taken with a CCD (Charged Coupled Device) color image sensor in an 8-level gradation data form of RGB (Red, Green, and Blue) on a recording medium such as a flash memory, and outputs the data of image that is to be printed via the cable 6. In addition, when power is supplied from the printer 1 via the cable 6, the secondary battery for the digital camera 5 is recharged using the power.

As shown in FIG. 1, the printer 1 includes a printer main body 2 and a coin box 3, which is connected to the printer main body 2 via a cable 4. The printer main body 2 further includes a printer unit 210, an external device connecting interface unit 220, a power switch 230, a power source unit 240, and a main body control unit 250 for comprehensively controlling the printer unit 210 and the power source unit 240.

The printer unit 210 is a so-called tandem-type with an intermediate transfer system. The printer unit 210 includes a transfer belt 211, rollers 2111, 2112, and 2113, and a plurality of image forming units 213Y to 213K, a paper cassette 214, a paper supplying unit 215, a transfer unit 216, a fixing unit 217, a paper exiting unit 218, and a sensor 219. The rollers 2111, 2112, and 2113 hold the transfer belt 211 and rotate the transfer belt 211 in the direction of an arrow "A" at a predetermined system speed. The image forming units 213Y to 213K are disposed along the transfer belt 211, form differently colored toner images of yellow (Y), magenta (M), cyan (C), and black (K) according to image signals that have been transferred from the main body control unit 250, and transfer the toner images onto the transfer belt 211 at transfer positions T1 to T4 so that the toner images are superimposed. The paper cassette 214 holds a pile of recording sheets S of a predetermined size. The paper supplying unit 215 supplies the recording sheets S one sheet at a time. The transfer unit 216 re-transfers the toner images that have been transferred onto the transfer belt 211 onto the recording sheet S. The fixing unit 217 is provided with a fixing roller for fixing the different-colored toner onto the recording sheet S by applying heat. The paper exiting unit 218 exits the recording sheet S onto which the toner have been fixed. The sensor 219 optically detects a reference mark (not illustrated) that has been formed on the transfer belt 211.

Note that each of the image forming units 213Y to 213K is a well-known unit structure that includes a photoconductive drum, a printer head, a cleaner, a charge neutralizing unit, a sensitizing charger, a developing unit, and a transfer charger. The printer head exposes the surface of the photoconductive drum with a light beam that has been optically modulated according to the image signals (Y) to (K). The image forming units 213Y to 213K each have the same structures apart from the toner color.

Here, explanations of the structures of the external device connecting interface unit 220, the power source unit 240, and the main body control unit 250 in the printer main body 2 will be given.

Figure 2:
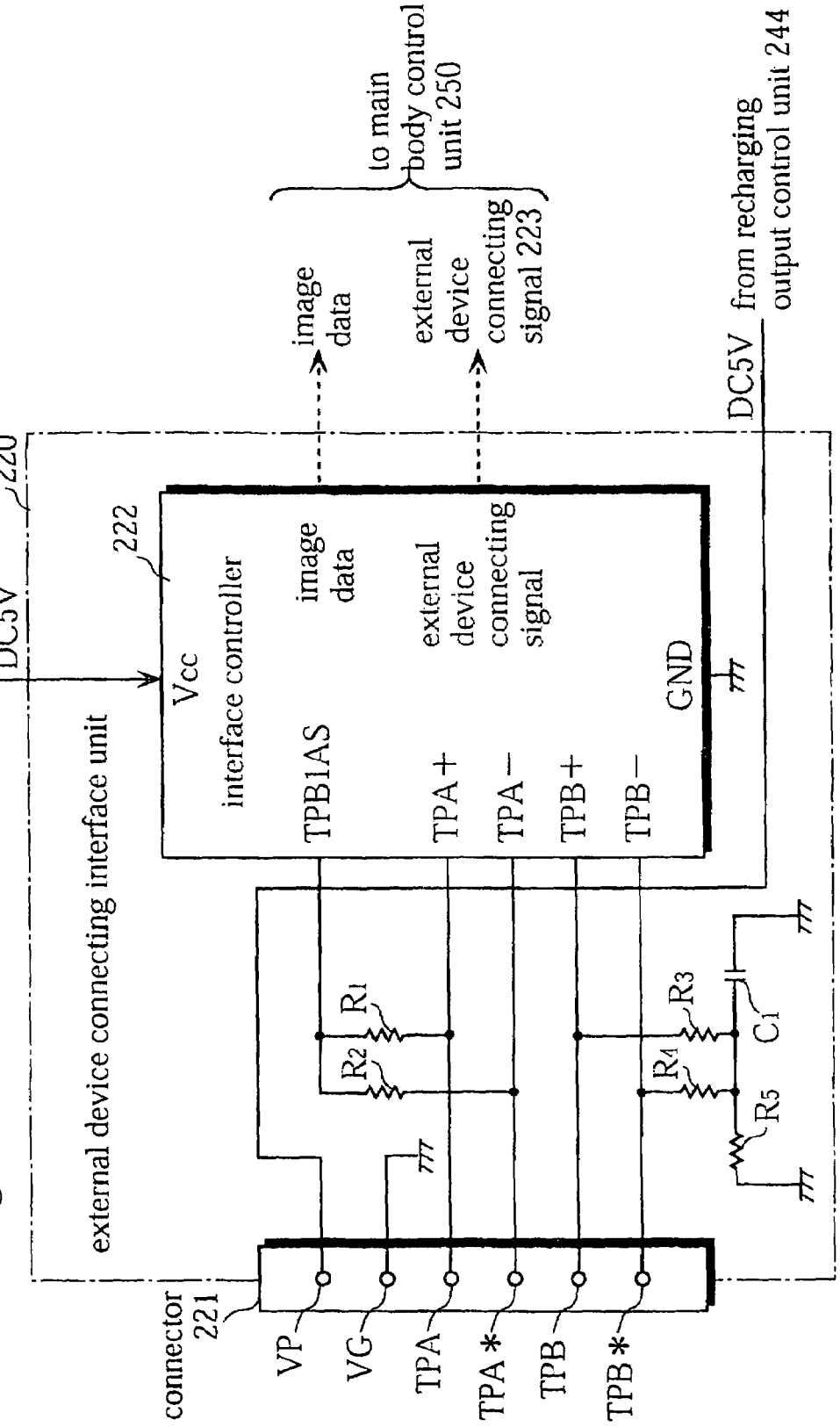
FIG. 2 is a block diagram showing the structure of an external device connecting interface unit.

FIG. 2 is a block diagram showing the structure of the external device connecting interface unit 220.

As the external device connecting interface unit 220, the high-speed serial interface, IEEE1394 is used in this specification. The external device connecting interface unit 220 includes a connector 221 which a plug 61 of the cable 6 is inserted into and removed from and an interface controller 222 in which a circuit of the physical layer and the data link layer is integrated into one chip.

To operate the interface controller 222, power (here, DC5V) is supplied to the interface controller 222 from an auxiliary power source unit 243 (refer to FIG. 3) in the power source unit 240. The interface controller 222 is provided with a bias voltage output port TPBIAS, a pair of I/O (input/output) ports TPA+ and TPA−, a pair of I/O ports TPB+ and TPB−, an image data output port, an external device connecting signal output port. The bias voltage output port TPBIAS outputs a predetermined bias voltage (1.86V, for instance). The I/O ports TPA+ and TPA− differentially transmit strobe signals and receives data. The I/O ports TPB+ and TPB− differentially transmit data and receives strobe signals. The image data output port outputs image data that has been received from the digital camera 5 to the main body control unit 250. The external device connecting signal output port outputs an external device connecting signal 223, which indicates whether the external device is connected, to the main body control unit 250.

The I/O ports TPA+ and TPA− are connected to pins TPA and TPA* (note that the "*" indicates the negative logic) of the connector 221, respectively and to the bias voltage output port TPBIAS via terminating resistances R1 and R2. The I/O ports TPB+ and TPB− are connected to pins TPB and TPB*, respectively and are grounded via terminating resistances R3, R4, and R5 and a terminating capacitor C1. Note that the resistance of the terminating resistances R1 to R4 is set at 55Ω), the resistance of the terminating resistance R5 is set at 5 kΩ, and the capacity of the terminating capacitor C1 is set at 250 pF. Meanwhile, to a pin VP of the connector 221, recharging power (here, DC5V) is supplied from a recharging output control unit 244 in the power source unit 240 (refer to FIG. 3). A pin VG is grounded.

Here, the digital camera 5 is equipped with an external device connecting interface unit that has the same structure as the external device connecting interface unit 220.

The cable 6 is a 6-conductor cable composed of a pair of the power source lines (the pins VP, VG) and two pairs of signal wires (the pins TPA and TPA* and the pins TPB and TPB*), which transmit serial data and strobe signals as differential signals. The pins TPA and TPA* of the digital camera 5 are connected to the pins TPB and TPB* of the printer main body 2 and the pins TPB and TPB* of the digital camera 5 are connected to the pins TPA and TPA* of the printer main body 2 so as to symmetrically connect the digital camera 5 and the printer main body 2.

Here, the pins TPA and TPA* are pulled up to TPBIAS=1.86V via the terminating resistances R1, R2, and the pins TPB and TPB* are grounded, i.e., pulled down via the terminating resistances R3 to R5 and the terminating capacitor C1. As a result, when the plug 61 of the cable 6, i.e., the digital camera 5 is not connected to the connector 221, the I/O ports TPB+ and TPB− of the interface controller 222 are pulled down.

On the other hand, when the plug 61 of the cable 6 is connected to the connector 221, the I/O ports TPB+ and TPB− of the interface controller 222 are connected to the I/O ports TPA+ and TPA− of the interface controller (mentioned above) of the digital camera by symmetrically connecting the cable 6. As a result, to the I/O ports TPB+ and TPB− of the interface controller 222, TPBIAS=1.86V is supplied, and the I/O ports TPB+ and TPB− are pulled up to about 1.86V since the value of R5 is remarkably larger than the values of R3, R4.

The interface controller 222 checks whether the I/O ports TPB+ and TPB− are pulled up at regular intervals. When the I/O ports TPB+ and TPB− are pulled up, the interface controller 222 judges that the digital camera 5 is connected. The interface controller 222 sets the external device connecting signal 223 at "1" and outputs the external device connecting signal 223 to the main body control unit 250 from the external device connecting signal output port. On the other hand, when the I/O ports TPB+ and TPB− are pulled down, the interface controller 222 judges that the digital camera 5 is not connected. The interface controller 222 sets the external device connecting signal 223 at "0" and outputs the external device connecting signal 223 to the main body control unit 250.

Note that the interface controller 222 corresponds to the hot plug. As a result, the plug 61 of the cable 6 can be inserted and removed while the printer main body is ON, and the system needs not to be reset after inserting and removing the plug 61.

Also, the interface controller 222 corresponds to the automatic configuration. As a result, whenever the plug 61 of the cable 6 is removed and inserted, the network is automatically re-configured and the connected device is automatically detected and set. When the digital camera 5 is connected via the cable 6, image data that has been transmitted from the digital camera 5 is received and the received image data is output to the main body control unit 250 from the image data output port after the automatic configuration.

Figure 3:
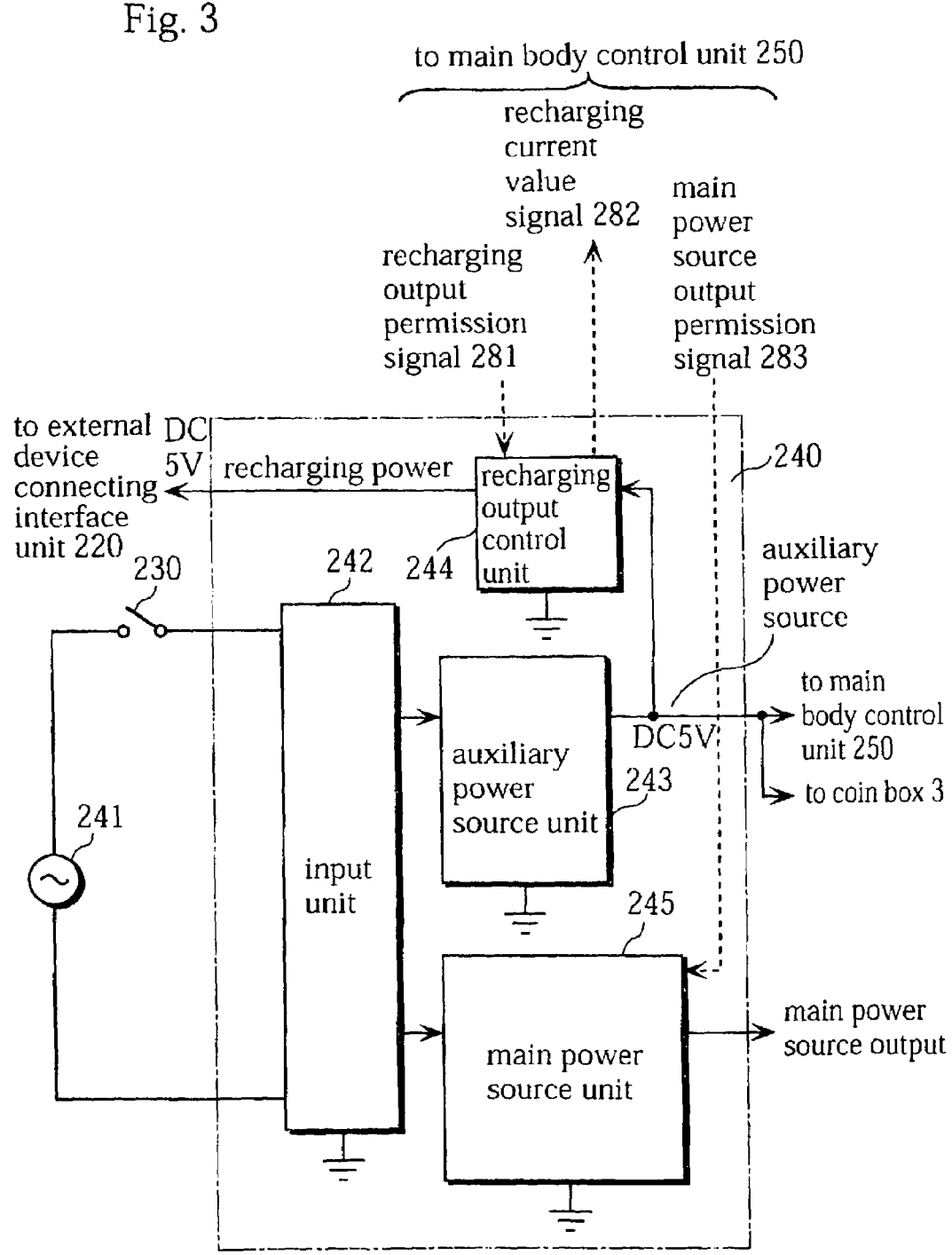
FIG. 3 is a block diagram showing the structure of a power source unit.

FIG. 3 is a block diagram showing the structure of the power source unit 240.

As shown in FIG. 3, the power source unit 240 includes an input unit 242, the auxiliary power source unit 243, the recharging output control unit 244, and a main power source unit 245.

The input unit 242 further includes a noise filter (not illustrated) that prevents the EMI (ElectroMagnetic Interference) and an anti-inrush current power thermistor. When the power switch 230 is ON, the input unit 242 outputs the current supplied from the commercial AC power source 241 to the auxiliary power source unit 243 and the main power source unit 245 via the noise filter and the like.

The auxiliary power source unit 243 is a power-factor-improving switching power source where the phase difference between the current and the voltage of the AC circuit is almost "0". The auxiliary power source unit 243 converts the current that has been supplied by the input unit 242 into a predetermined DC voltage (here, 5V) by switching operation, and supplies the 5V voltage as the auxiliary power to the main body control unit 250, the coin box 3, and the recharging output control unit 244 as 20-long as the power switch 230 is ON.

The recharging output control unit 244 includes a current detector and a switching device such as the analogue switch. When a signal indicating "1" is sent as a recharging output permission signal 281 from the main body control unit 250, the recharging output control unit 244 has the switching device operate and outputs the input DC5V as it is as the recharging power to the external device connecting interface unit 220.

The DC5V that has been output to the external device connecting interface unit C220 (in FIG. 2) is sent to the digital camera 5 via the pin VP of the connector 221 and the cable 6. With the sent DC5V, the secondary battery of the digital camera 5 is recharged. Here, the recharging output permission signal 281 is "1" when the main body control unit 250 permits the power supplying to the digital camera 5 and "0" when the main body control unit 250 does not permit the power supplying to the digital camera.

The recharging output control unit 244 has the current detector detect the amount of power that has been sent by supplying power to the digital camera 5 when the recharging output permission signal 281 is "1", and outputs a recharging current value signal 282 that indicates the detection result to the main body control unit 250. The main body control unit 250 obtains the amount of power that has been supplied to the digital camera 5 according to the recharging current value signal 282.

On the other hand, when the recharging output permission signal 281 is "0", the recharging output control unit 244 stops the switching device operating and stop the DC5V output to the external device connecting interface unit 220. More specifically, the power supplying to the digital camera 5 is stopped.

The main power source unit 245 is also a power-factor-improving switching power source as in the case of the auxiliary power source unit 243. When the main power source output permission signal 283 from the main body control unit 250 indicates "1", the main power source unit 245 converts the current that has been supplied from the input unit 242 to a predetermined DC voltage (for instance, 12V or 24V) by the switching operation. The main power source unit 245 supplies the DC voltage as the main power source to the electric units in the printer unit 210 such as the image forming units 213Y to 213K, the paper supplying unit 215, the transfer unit 216, and the fixing unit 217. In the fixing unit 217, the heater starts to apply heat to the built-in fixing roller. The fixing roller is heated to a temperature that is necessary for the fixing roller to fix toner on the recording sheet (the fixing temperature) and is kept at the fixing temperature (the state when the main power source is supplied to the units is referred to the "fixing mode" in this specification). As a result, printing can be performed in the printer unit 210.

On the other hand, when the main power source output permission signal 283 from the main body control unit 250 indicates "0", the main power source unit 245 stops supplying the main power source to the printer unit 210 by stopping the switching operation. As a result, electricity is saved when the units are not used (the state when the main power source is not supplied to the units is referred to the "standby mode" in this specification).

Note that the main power source output permission signal 283 is output from the main body control unit 250 to indicate whether the printer unit 210 is switched to the standby mode or the fixing mode.

Figure 4:
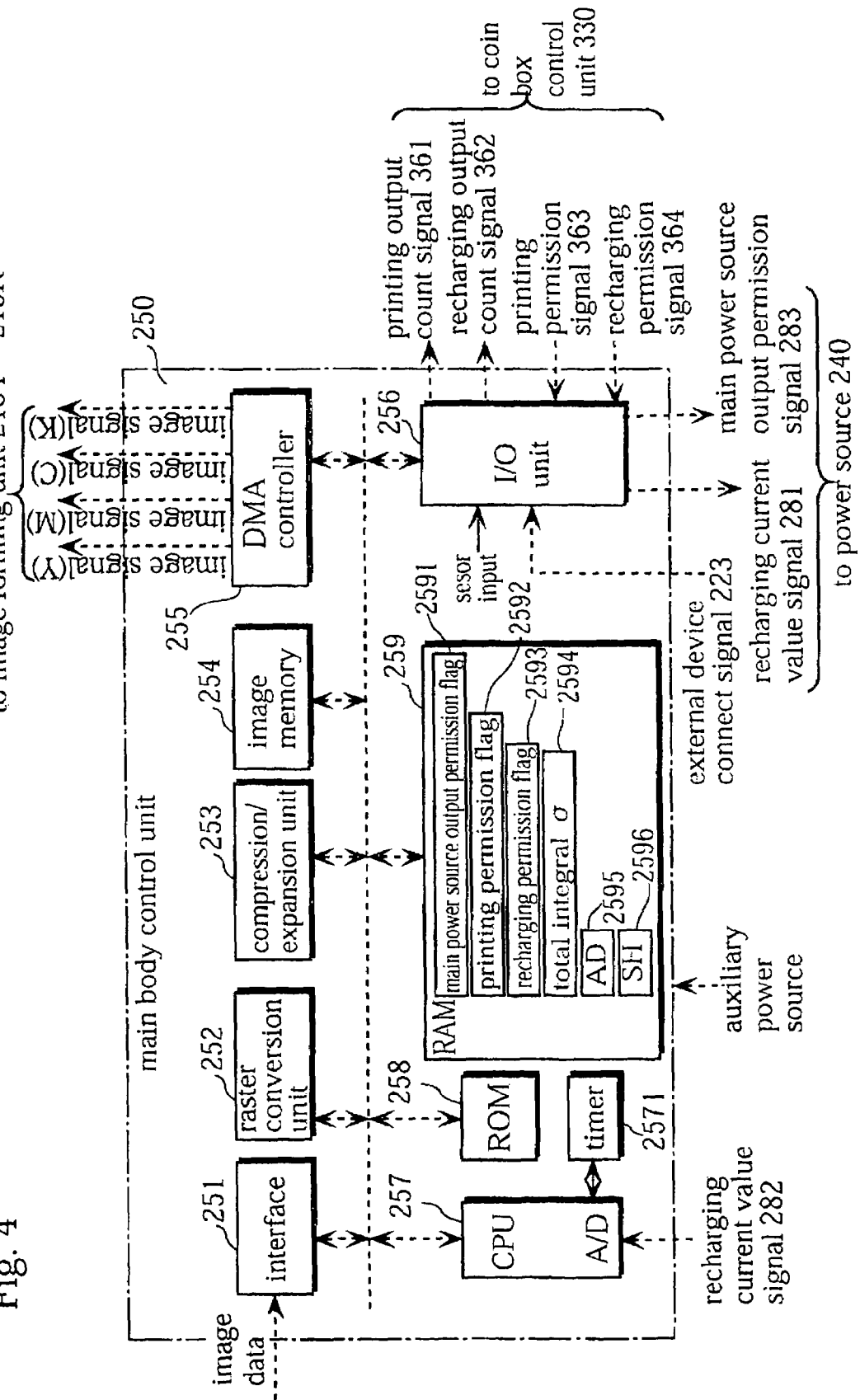
FIG. 4 is a block diagram showing the structure of a main body control unit.

FIG. 4 is a block diagram showing the structure of the main body control unit 250.

As shown in FIG. 4, the main body control unit 250 includes an interface 251, a raster conversion unit 252, a compression/expansion unit 253, an image memory 254, a DMA controller 255, an I/O unit 256, a CPU 257, a ROM 258, a RAM 259. The main body control unit 250 operates using the auxiliary power source from the power source unit 240.

The interface 251 receives image data of colors R, G, and B that has been transmitted from the interface controller 222 and outputs the color image data to the raster conversion unit 252.

The raster conversion unit 252 performs the bit map expansion on each piece of the color image data, generates image data of reproductive colors Y, M, C, and K, and outputs the reproductive color image data to the compression/expansion unit 253.

The compression/expansion unit 253 compresses the image data of colors Y to K into several bits from 8 bits according to the instruction from the CPU 257 and stores the compressed image data in the image memory 254. Also, the compression/expansion unit 253 expands the compressed image data to the original 8-bit image data of colors Y to K and outputs the expanded image data to the DMA controller 255.

The image memory 254 stores the image data of colors Y to K by color.

The DMA controller 255 outputs the image data of colors Y to K that has been expanded by the compression/expansion unit 253 as image signals to the image forming units 213Y to 213K one line at a time with predetermined timing.

I/O unit 256 receives a variety of sensors including the sensor 219. Also, the I/O unit 256 receives and outputs the external device connecting signal 223 from the external device connecting interface unit 220, a printing permission signal 363 and a recharging permission signal 364 from a coin box control unit 330 of the coin box 3. Here, the printing permission signal 363 is output from the coin box control unit 330 to indicate that image forming operation is permitted when coins are put into the coin box 3. The recharging permission signal 364 is output from the coin box control unit 330 to indicate that power supplying is permitted when coins corresponding to the charge for the power supplying to the digital camera is put into the coin box 3.

Meanwhile, the I/O unit 256 outputs a printing output count signal 361 and a recharging output count signal 362, which each will be explained later, to the coin box control unit 330 according to the instruction from the CPU 257 and transmits the main power source output permission signal 283 and the recharging output permission signal 281 to the power source unit 240.

In the ROM 258, a program for controlling the main power source unit 245 in the power source unit 240, a power saving management operation program for switching the standby mode and the fixing mode, a program concerning the image forming operations in the printer unit 210, a recharging operation program are stored in advance.

The RAM 259 provides a work area for the CPU 257 to execute a program, and sets the areas of a main power source output permission flag 2591, a printing permission flag 2592, a recharging permission flag 2593, a total integral 2594, an AD 2595, and an SH 2596 that are necessary at the time of program execution in the work area. A more detailed explanation of the main power source output permission flag 2591, the printing permission flag 2592, the recharging permission flag 2593, the total integral 2594, the AD 2595, and the SH 2596 will be given later.

The CPU 257 reads a necessary program from the ROM 258 and comprehensively controls the operations in the interface 251 to the I/O unit 256. Also, the CPU 257 comprehensively controls the operations by the power source unit 240 and the printer unit 210 with adjusting the timing according to the communication with the coin box control unit 330 in the coin box 3. Eventually, the CPU 257 executes the image forming operation and the recharging operation as the service providing operation.

In addition, the CPU outputs the printing output count signal 361 whenever image forming operation for one recording sheet S is completed and the recharging output count signal 362 whenever a predetermined amount of power is supplied to the digital camera 5. Also, the CPU reads the power saving management operation program and switches the standby mode and the fixing mode. A more detailed explanation of the service providing operation and the power saving management operation will be given later.

Moreover, the CPU 257 starts the image forming operation in each of the image forming units 213Y to 213K at intervals of a predetermined number of counts that are counted by a timer 2571. As a result, the toner image that have been formed in the image forming units 213Y to 213K are precisely superimposed on the transfer belt 211. Furthermore, the CPU 257 receives the recharging current value signal 282 from the recharging output control unit 244 in the power source unit 240 and obtains the amount of power that is to be supplied to the digital camera 5.

Figure 5:
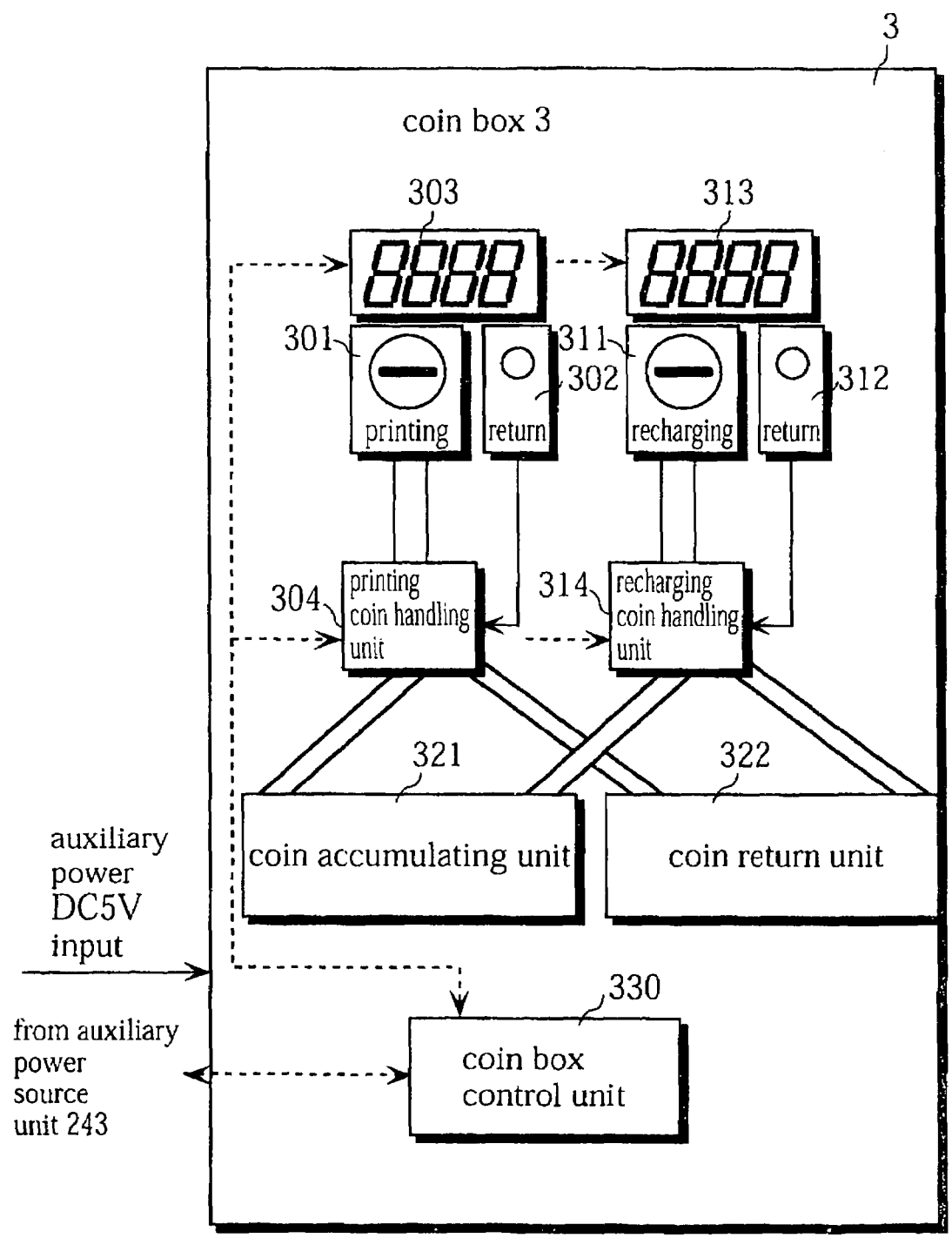
FIG. 5 shows the overall structure of a coin box.

FIG. 5 shows the overall structure of the coin box 3.

As shown in FIG. 3, the coin box 3 includes a printing coin slot 301, a printing coin return button 302, a printing display 303, a printing coin handling unit 304, a recharging coin slot 311, a recharging coin return button 312, a recharging display 313, a recharging coin handling unit 314, a coin accumulating unit 321, a coin return unit 322, and a coin box control unit 330. Coins corresponding to the charge for image forming are put into the printing coin slot 301. The printing coin return button 302 is used for requesting to return remaining coins. Coins corresponding to the charge for recharging the secondary battery of the digital camera 5 are put into the recharging coin slot 311. The recharging coin return button 312 is used for requesting to return remaining coins. The coin accumulating unit 321 accumulates coins that have been used for printing and recharging. The coin return unit 322 returns remaining coins according to the operation of the printing coin return button 302 and the recharging coin return button 312. The coin box control unit 330 controls the units in the coin box 3. Each of the units in the coin box 3 operates by DC5V that has been output from the auxiliary power source unit 243 in the power source unit 240 as the auxiliary power.

Figure 6:
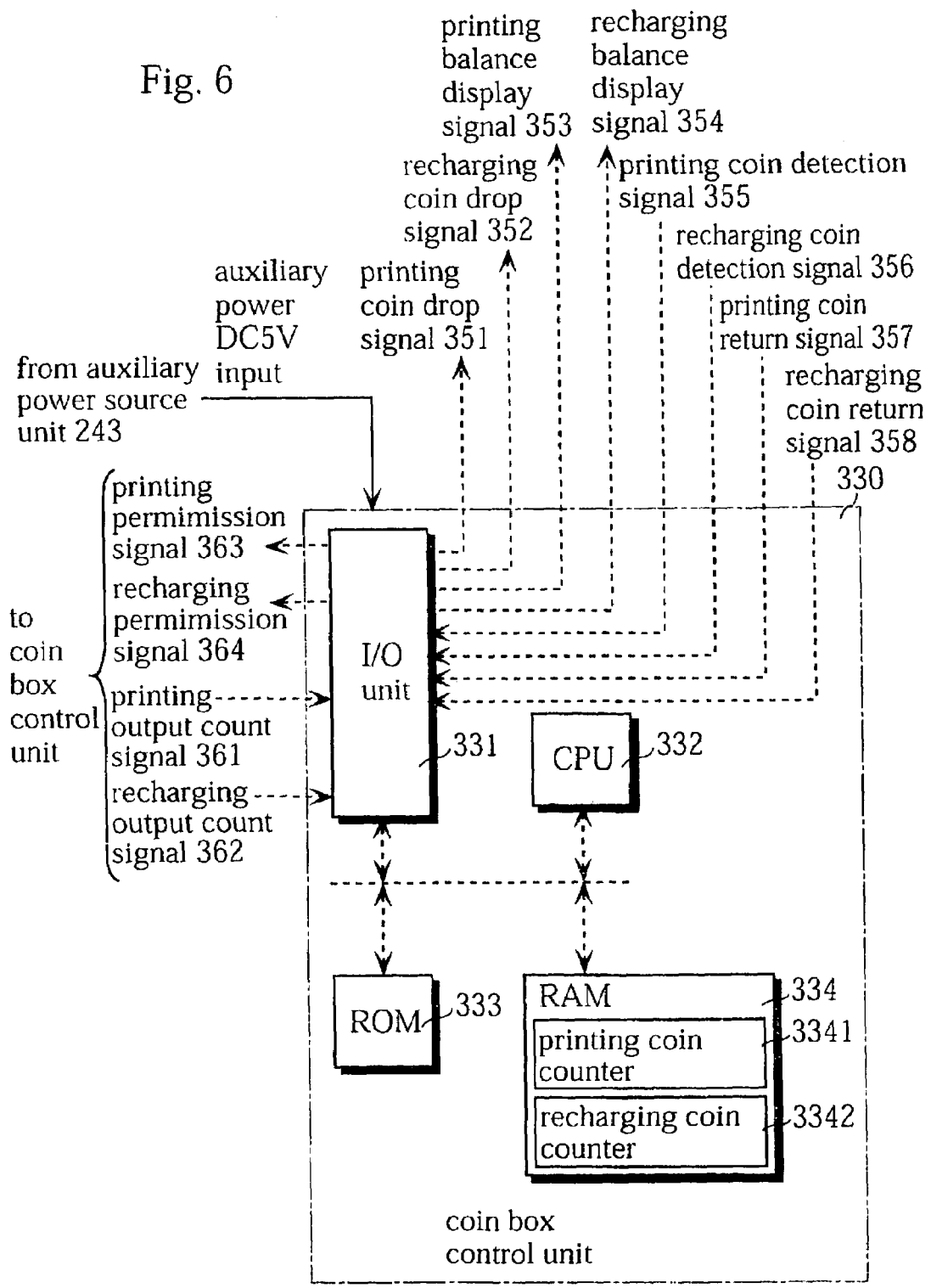
FIG. 6 is a block diagram showing the structure of a coin box control unit.

FIG. 6 is a block diagram showing the structure of the coin box control unit 330. As shown in FIG. 6, the coin box control unit 330 includes an I/O unit 331, a CPU 332, a ROM 333, and a ROM 334.

Explanation of the units will be given below with reference to FIGS. 5 and 6.

The printing display 303 displays the amount of money that has been put into the printing coin slot 301 and the balance after charging according to a printing balance display signal 353 from the coin box control unit 330. Here, the printing balance display signal 353 is output to the printing display 303 from the CPU 332 via the I/O unit 331 and a signal for indicating the amount of money that has been put and the balance.

The printing coin handling unit 304 temporarily accumulates the coins that have been put into the printing coin slot 301 to detect the amount of money. Then, the printing coin handling unit 304 outputs a printing coin detection signal 355, which indicate the detected amount of money, to the CPU 332 via the I/O unit 331 in the coin box control unit 330. As a result, the CPU 332 obtains the amount of money put into for printing.

Also, when the user operates the printing coin return button 302, the printing coin handling unit 304 outputs a printing coin return signal 357 to the CPU 332 and sends the remaining coins to the coin return unit 322 to return the coins to the user.

On the other hand, when receiving a printing coin drop signal 351 from the coin box control unit 330, the printing coin handling unit 304 drops remaining coins corresponding to the charge for image forming on one recording sheet S into the coin accumulating unit 321. Here, the printing coin drop signal 351 is a signal that is output from the CPU 332 to the printing coin handling unit 304 via the I/O unit 331 whenever the CPU 332 receives the printing output count signal 361 from the main body control unit 250.

The recharging display 313 displays the amount of money that has been put into the recharging coin slot 311 and the balance after charging according to a recharging balance display signal 354 from the coin box control unit 330. Here, the recharging balance display signal 354 is output to the recharging display 313 from the CPU 332 via the I/O unit 331 and a signal for indicating the amount of money that has been put and the balance.

The recharging coin handling unit 314 temporarily accumulates the coins that have been put into the recharging coin slot 311 to detect the amount of money. Then, the recharging coin handling unit 314 outputs a recharging coin detection signal 356, which indicate the detected amount of money, to the CPU 332 via the I/O unit 331 in the coin box control unit 330. As a result, the CPU 332 obtains the amount of money put into for recharging.

Also, when the user operates the recharging coin return button 312, the recharging coin handling unit 314 outputs a recharging coin return signal 358 to the CPU 332 and sends the remaining coins to the coin return unit 322 to return the coins to the user.

On the other hand, when receiving a recharging coin drop signal 352 from the coin box control unit 330, the recharging coin handling unit 314 drops remaining coins corresponding to the charge for the amount of power that is to be supplied to the digital camera 5 for recharging into the coin accumulating unit 321. Here, the recharging coin drop signal 352 is a signal that is output from the CPU 332 to the recharging coin handling unit 314 via the I/O unit 331 whenever the CPU 332 receives the recharging output count signal 362 from the main body control unit 250.

The I/O unit 331 in the coin box control unit 330 receives the printing output count signal 361 and the recharging output count signal 362 from the main body control unit 250 and transmits the printing permission signal 363 and the recharging permission signal 364 to the main body control unit 250. Also, the I/O unit 331 receives the input of the printing coin detection signal 355 and the printing coin return signal 357 from the printing coin handling unit 304, and the recharging coin detection signal 356 and the recharging coin return signal 358 from the recharging coin handling unit 314. In addition, the I/O unit 331 outputs the printing coin drop signal 351 to the printing coin handling unit 304, the printing balance display signal 353 to the printing display 303, the recharging coin drop signal 352 to the recharging coin handling unit 314, and the recharging balance display signal 354 to the recharging display 313.

Meanwhile, the ROM 333 stores programs including a coin box operation program, which will be explained later, in advance. The ROM 333 also stores the data of the charge for image forming on one recording sheet S (referred to the "charge per printing" in this specification) and the charge for a predetermined amount of power that is to be supplied to the digital camera 5 for recharging (referred to the "charge per recharging" in this specification).

The RAM 334 provide the work areas for executing the programs in the CPU 332 and sets the areas in the work areas for a printing coin counter 3341 and a recharging coin counter 3342 and the like which each are necessary to execute the programs. Here, the printing coin counter 3341 indicates the number of recording sheets S on which image is formed for the remaining coins for printing. On the other hand, the recharging coin counter 3342 indicates the number of times a predetermined amount of power can be supplied for the remaining coins for recharging.

The CPU 332 reads required programs to execute the coin box operation.

Figure 7:
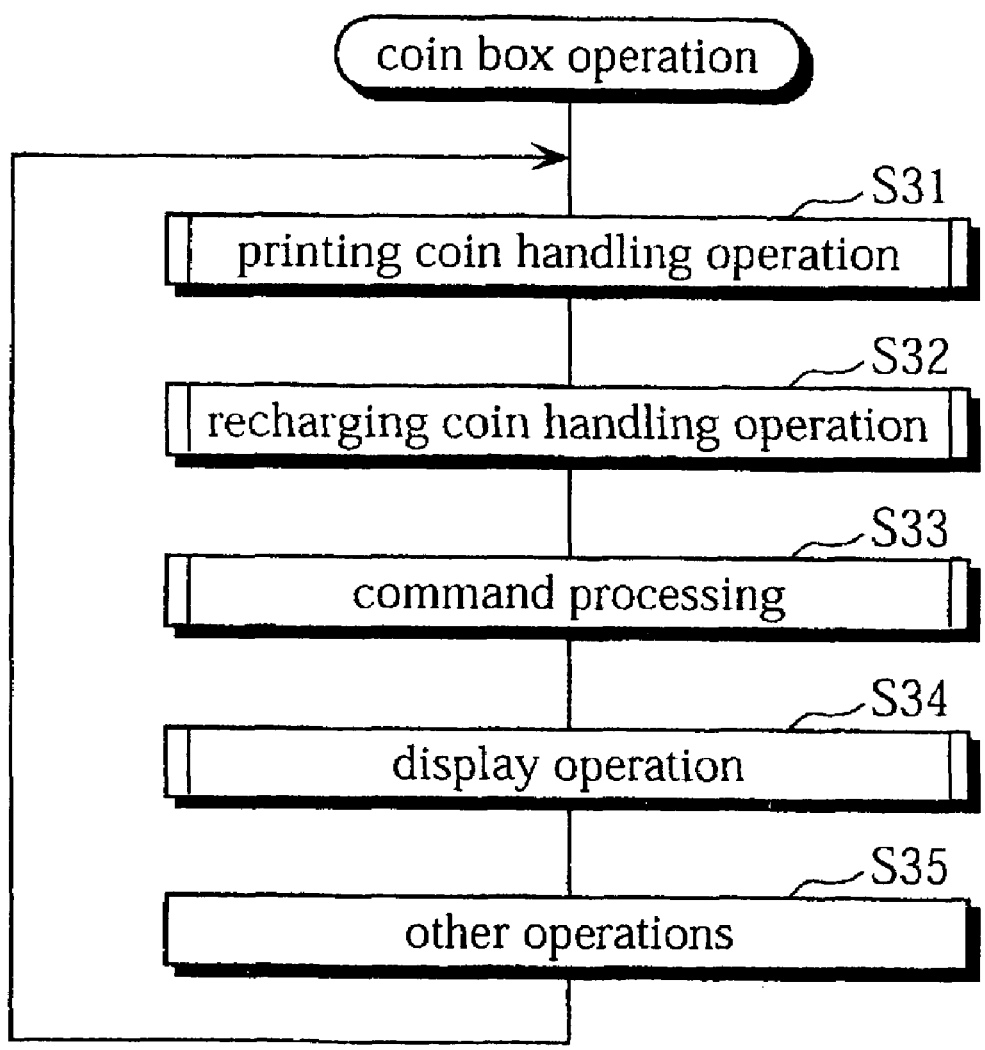
FIG. 7 is a flowchart showing the main routine of a coin box operation by a CPU in the coin box control unit.

FIG. 7 is a flowchart showing the main routine of the coin box operation by the CPU 332.

The CPU 332 in the coin box control unit 330 routinely repeats a printing coin handling operation (step S31), a recharging coin handling operation (step S32), a command processing (step S33), a display operation (step S34), and other operations (step S35) while the DC5V is input as the auxiliary power source from the auxiliary power source unit 243.

An overall explanation of the operations and processing will be given below. In the printing coin handling operation at step S31, the CPU 332 increments or decrements the count value P of the printing coin counter 3341, or clears the count value P to zero according to a predetermined signal.

In the recharging coin handling operation at step S32, the CPU 332 increments or decrements the count value J of the recharging coin counter 3342, or clears the count value J to zero according to a predetermined signal.

In the command processing at step S33, the CPU 332 transmits the printing permission signal 363 and the recharging permission signal 364 to the main body control unit 250 according to the count value P of the printing coin counter 3341 and the count value J of the recharging coin counter 3342.

In the display operation at step S34, the CPU 332 outputs the printing balance display signal 353, which indicates the amount of money that has been input and the remaining amount after charging, to the printing display 303 according to the counter value P of the printing coin counter 3341. Also, the CPU 332 outputs the recharging balance display signal 354, which also indicates the amount of money that has been input and the remaining amount after charging, to the recharging display 313 according to the count value J of the recharging coin counter 3342.

Here, more-detailed explanations of the printing coin handling operation, the recharging coin handling operation, the command processing, the display operation will be given in order.

Figure 8:
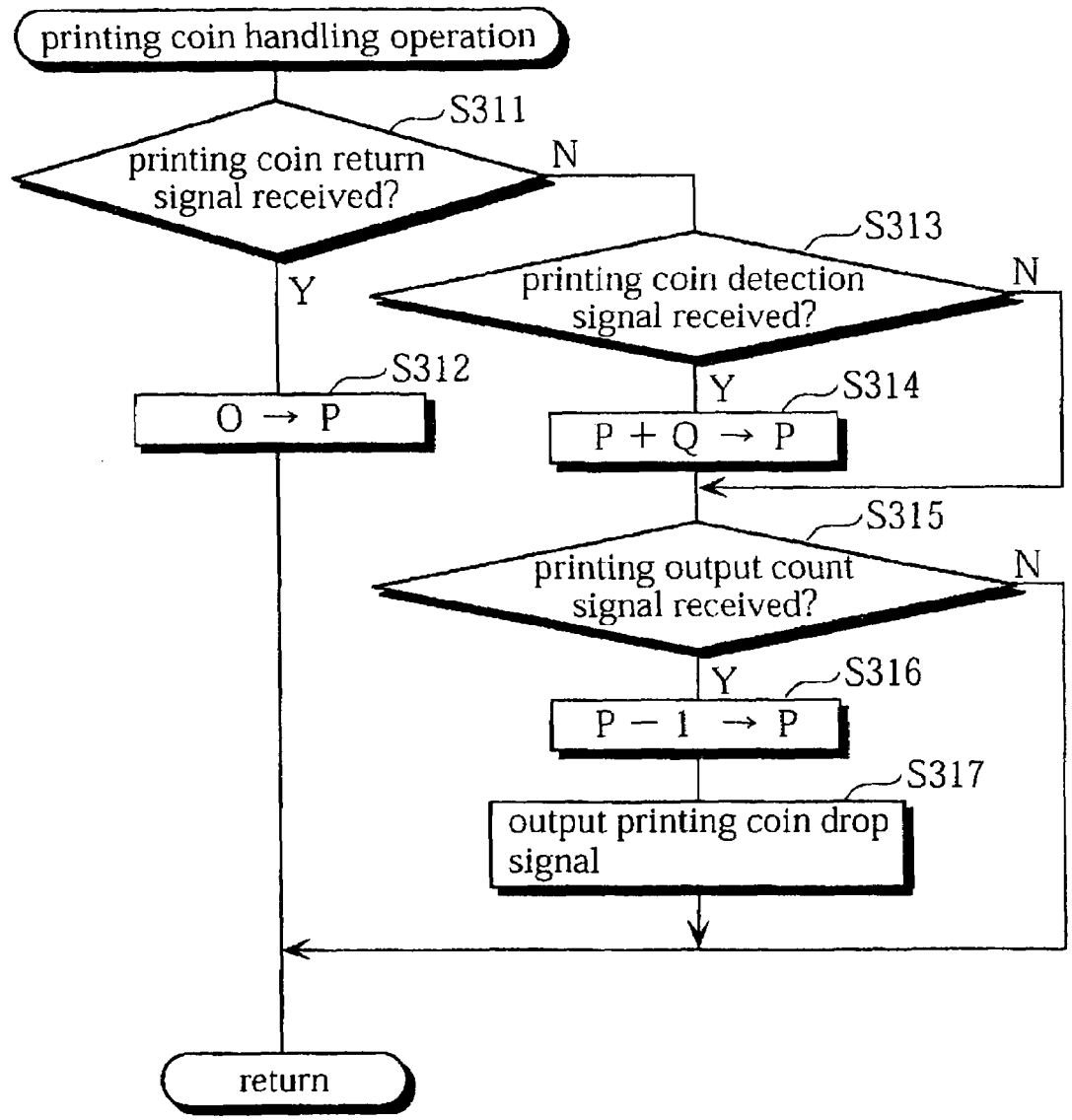
FIG. 8 is a flowchart showing the subroutine of the printing coin handling operation in step S31 in FIG. 7.

FIG. 8 is a flowchart showing the subroutine of the printing coin handling operation in FIG. 7 (step S31).

First, the CPU 332 judges whether the printing coin return signal 357 has been received from the printing coin handling unit 304 (step S311). When the printing coin return signal 357 has been received (when the result of the judgement at step S311 is "Y"), all the coins that have been temporarily accumulated in the printing coin handling unit 304 are returned and no coins remain in the printing coin handling unit 304. Not making any charge for image forming, the CPU 332 judges that no image can be formed and clears the count value P of the printing coin counter 3341 to "0" (step S312). The processing returns to the main routine shown in FIG. 7.

On the other hand, when receiving no printing coin return signal 357 (when the result of the judgement at step S311 is "N"), the CPU 332 judges whether the printing coin detection signal 355 has been received from the printing coin handling unit 304 (step S313). When the printing coin detection signal 355 has been received (when the result of the judgement at step S313 is "Y"), coins have been put into the printing coin slot 301. The CPU 332 obtains the amount of money from the printing coin detection signal 355 and determines an variable Q according to the amount of money (here, the variable Q indicates the number of recording sheets on which an image can be formed for the amount of money and is determined according to the amount of money and the charge per printing). Then, the CPU 332 increments the count value P of the printing coin counter 3341 by the variable Q (step S314), and the processing advances to step S315.

On the other hand, when the CPU 332 receives no printing coin detection signal 355 (when the result of the judgement at step S313 is "N"), the processing skips step S314 and advances to step S315.

At step S315, the CPU 332 judges whether the printing output count signal 361 from the main body control unit 250 has been received. Here, the printing output count signal 361 is output from the main body control unit 250 every time the image forming on one recording sheet has been completed. When receiving the printing output count signal 361 (when the result of the judgement at step S315 is "Y"), the CPU 332 decrements the count value P of the printing coin counter 3341 by one so as to make a charge for an image forming on one recording sheet (step S316). Then, the CPU 332 outputs the printing coin drop signal 351 to the printing coin handling unit 304 (step S317). As a result, the coins corresponding to the charge of printing are dropped into the coin accumulating unit 321 from the printing coin handling unit 304. Then, the processing returns to the main routine shown in FIG. 7.

On the other hand, when the CPU 332 receives no printing output count signal 361 (when the result of the judgement at step S315 is "N") due to image forming and the like, the processing skips steps S316 and S317 and returns to the main routine shown in FIG. 7.

Figure 9:
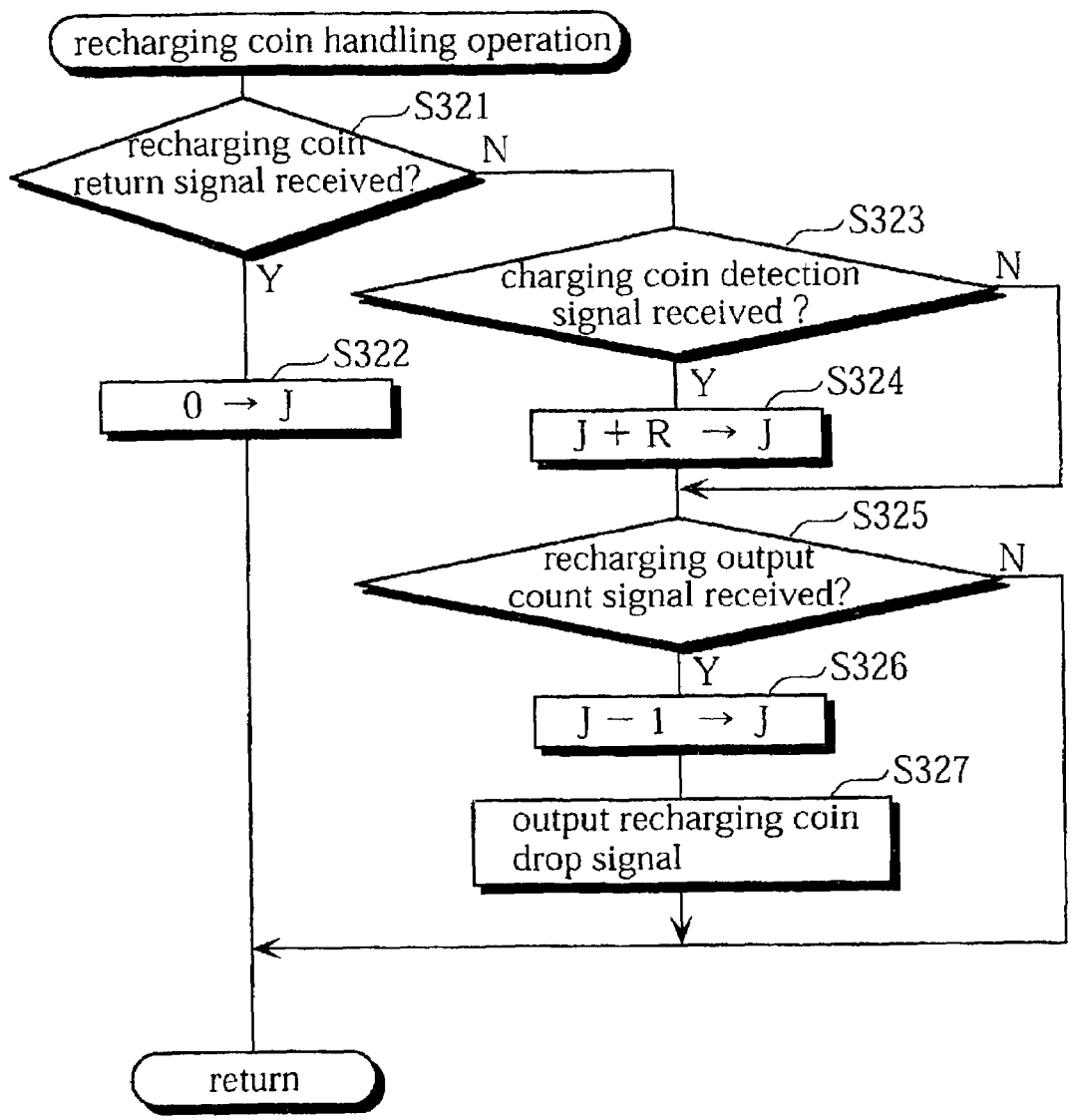
FIG. 9 is a flowchart showing the subroutine of the recharging coin handling operation in step S32 in FIG. 7.

FIG. 9 is a flowchart showing the subroutine of the recharging coin handling operation in FIG. 7 (step S32).

First, the CPU 332 judges whether the recharging coin return signal 358 has been received from the recharging coin handling unit 314 (step S321). When the recharging coin return signal 358 has been received (when the result of the judgement at step S321 is "Y"), all the coins that have been temporarily accumulated in the recharging coin handling unit 314 are returned and no coins remain in the recharging coin handling unit 314. Not making any charge for power supplying to the digital camera 5, the CPU 332 judges that no power can be supplied and clears the count value J of the recharging coin counter 3342 to "0" (step S322). The processing returns to the main routine shown in FIG. 7.

On the other hand, when receiving no recharging coin return signal 358 (when the result of the judgement at step S321 is "N"), the CPU 332 judges whether the recharging coin detection signal 356 has been received from the recharging coin handling unit 314 (step S323). When the recharging coin detection signal 356 has been received (when the result of the judgement at step S323 is "Y"), coins have been put into the recharging coin slot 311. The CPU 332 obtains the amount of money from the recharging coin detection signal 356 and determines an variable R according to the amount of money (here, the variable R indicates the number of supplying of a predetermined amount of power to the digital camera 5 and is determined according to the amount of money and the charge per recharging). Then, the CPU 332 increments the count value J of the recharging coin counter 3342 by the variable R (step S324), and the processing advances to step S325.

On the other hand, when the CPU 332 receives no recharging coin detection signal 356 (when the result of the judgement at step S323 is "N"), the processing skips step S324 and advances to step S325.

At step S325, the CPU 332 judges whether the recharging output count signal 362 from the main body control unit 250 has been received. Here, the recharging output count signal 362 is output from the main body control unit 250 every time the predetermined amount of power is supplied to the digital camera 5. When receiving the recharging output count signal 362 (when the result of the judgement at step S325 is "Y"), the CPU 332 decrements the count value J of the recharging coin counter 3342 by one so as to make a charge for supplying the predetermined amount of power (step S326). Then, the CPU 332 outputs the recharging coin drop signal 352 to the recharging coin handling unit 314 (step S327). As a result, the coins corresponding to the charge per recharging are dropped into the coin accumulating unit 321 from the recharging coin handling unit 314. Then, the processing returns to the main routine shown in FIG. 7.

On the other hand, when the CPU 332 receives no recharging output count signal 362 (when the result of the judgement at step S325 is "N") due to recharging and the like, the processing skips steps S326 and S327 and returns to the main routine shown in FIG. 7.

Figure 10:
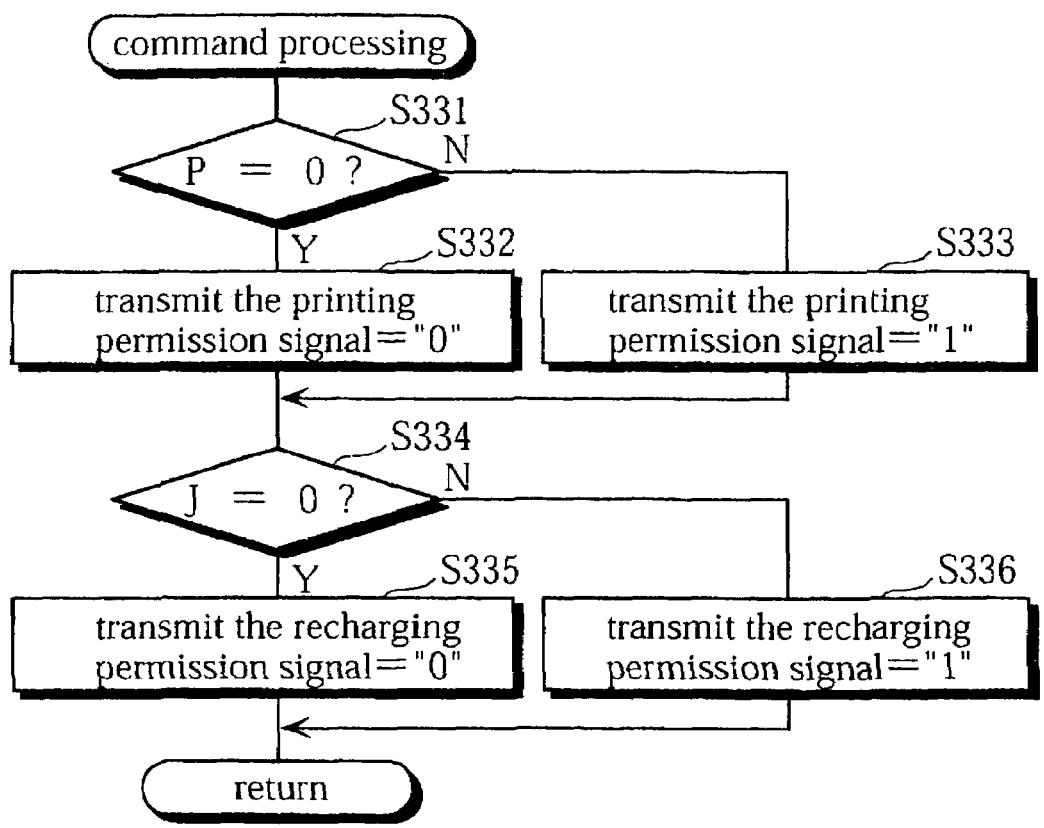
FIG. 10 is a flowchart showing the subroutine of the command processing in step S33 in FIG. 7.

FIG. 10 is a flowchart showing the subroutine of the command processing in FIG. 7 (step S33).

First, the CPU 332 refers to the count value P of the printing coin counter 3341 and judges whether the count value P is "0" (step S331). When the count value P is "0" (when the judgement result at step S331 is "Y"), no coins for image forming in the printer unit 210 remain in the printing coin handling unit 304. As a result, the CPU 332 transmits the printing permission signal 363 that has been set at "0" to the main body control unit 250 so as to prevent image forming (step S332). The processing advances to step S334.

On the other hand, when the count value P is not "0" (when the judgement result at step S331 is "N"), coins for image forming remain in the printing coin handling unit 304. The CPU 332 transmits the printing permission signal 363 that has been set at "1" to the main body control unit 250 so as to permit image forming (step S333). The processing advances to step S334. Here, when receiving the value "0" as the printing permission signal 363, the CPU 257 in the main body control unit 250 changes the printing permission flag 2592 to be "0", and when receiving the value "1", to be "1".

At step S334, the CPU 332 refers to the count value J of the recharging coin counter 3342 and judges whether the count value J is "0". When the count value J is "0" (when the judgement result at step S334 is "Y"), no coins for recharging remain in the recharging coin handling unit 314. As a result, the CPU 332 transmits the recharging permission signal 364 that has been set at "0" to the main body control unit 250 so as to prevent power supplying to the digital camera 5 (step S335). The processing returns to the main routine in FIG. 7.

On the other hand, when the count value J is not "0" (when the judgement result at step S334 is "N"), coins for recharging remain in the recharging coin handling unit 314. The CPU 332 transmits the recharging permission signal 364 that has been set at "1" to the main body control unit 250 so as to permit power supplying to the digital camera 5 (step S336). The processing returns to the main routine in FIG. 7. Here, when receiving the value "0" as the recharging permission signal 364, the CPU 257 in the main body control unit 250 changes the recharging permission flag 2593 to be "0", and when receiving the value "1", to be "1".

With the command processing, instructions to permit and prohibit image forming and power supplying to the digital camera 5 can be given.

Figure 11:
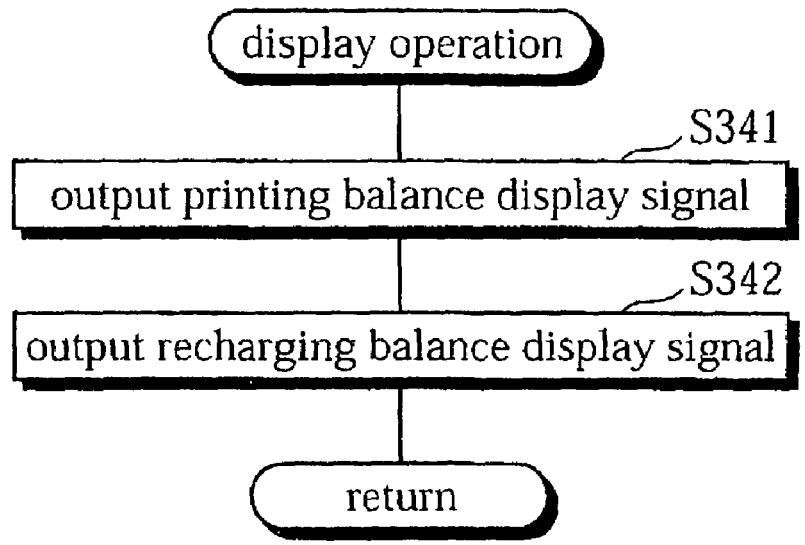
FIG. 11 is a flowchart showing the subroutine of the display operation in step S34 in FIG. 7.

FIG. 11 is a flowchart showing the subroutine of the display operation in FIG. 7 (step S34).

First, the CPU 332 outputs the printing balance display signal 353, which indicates the amount of money of the coins that has been put into for printing and the remaining amount after making a charge, to the printing display 303 according to the count value P of the printing coin counter 3341 and the received printing coin detection signal 355 (step S341). Then, the CPU 332 outputs the recharging balance display signal 354, which indicates the amount of money of the coins that has been put into for recharging and the remaining amount after making a charge, to the recharging display 313 according to the present count value J of the recharging coin counter 3342 and the received recharging coin detection signal 356 (step S342).

The printing display 303 indicates the amount of money corresponding to the coins that have been put into the printing coin slot 301 and the remaining amount of money after making a charge according to the printing balance display signal 353. On the other hand, the recharging display 313 indicates the amount of money corresponding to the coins that have been put into the recharging coin slot 311 and the remaining amount of money after making a charge according to the recharging balance display signal 354.

Here, explanations of the power saving management operation and the service providing operation by the CPU 257 in the main body control unit 250 will be given in order. Note that the power saving management operation and the service providing operation are executed in parallel.

Figure 12:
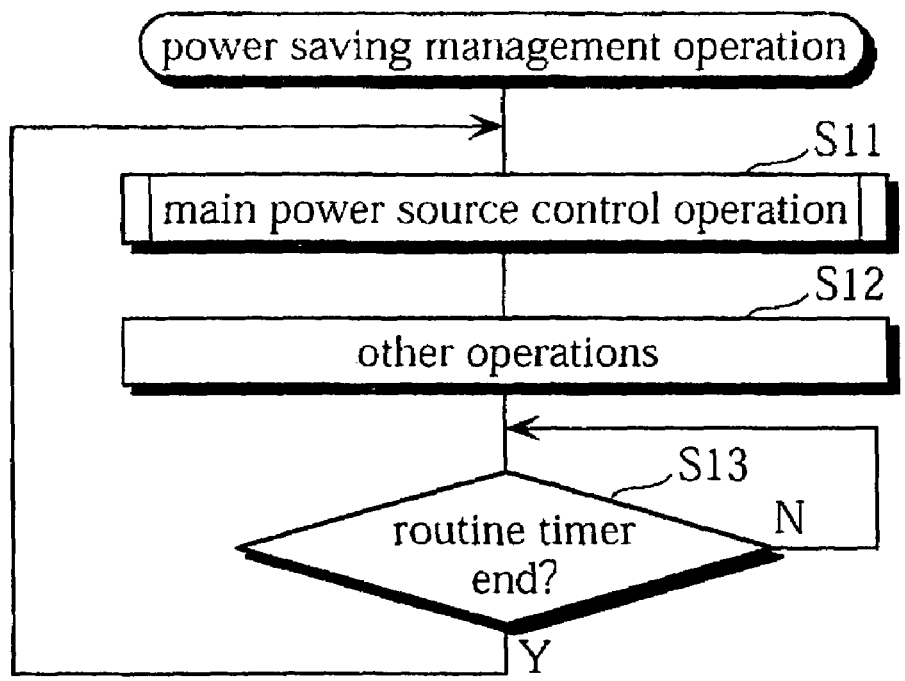
FIG. 12 is a flowchart showing the main routine of a power saving management operation by a CPU in the main body control unit.

FIG. 12 is a flowchart showing the main routine of the power saving management operation.

When the power switch 230 is turned ON and the auxiliary power from the auxiliary power source unit 243 is input into the main body control unit 250, the CPU 257 starts the routine timer to manage the time of the main routine of the power saving management operation (step S13). Then, the CPU 257 repeats a main power source control operation (step S11) and operations other than the operations at steps S11 and S13 (step S13).

Figure 13:
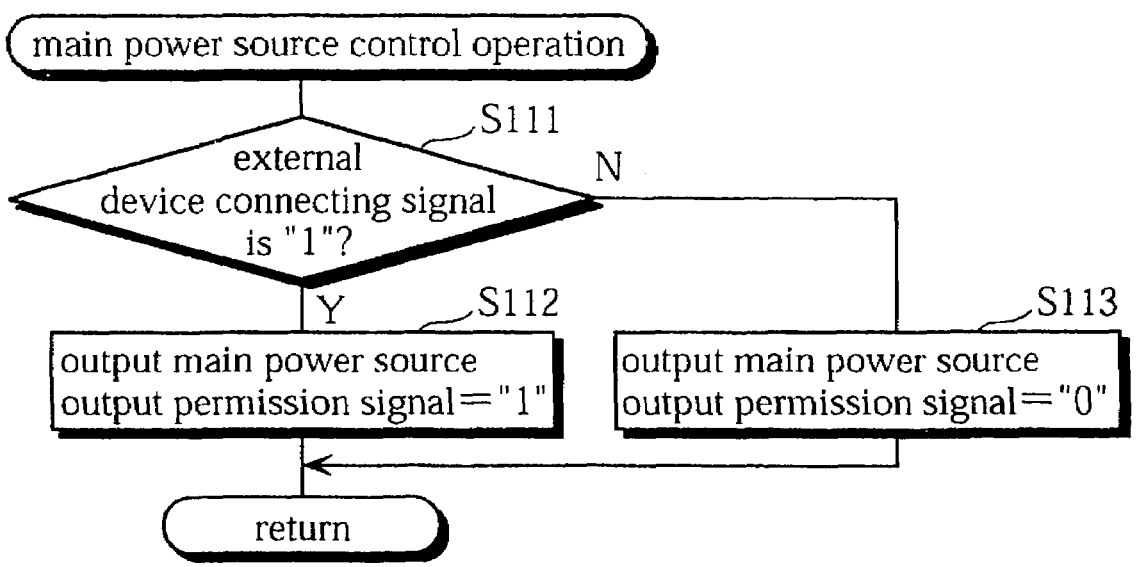
FIG. 13 is a flowchart showing the subroutine of the main power source control operation in step S11 in FIG. 12.

FIG. 13 is a flowchart showing the subroutine of the main power source control operation in FIG. 12 (step S11).

First, the CPU 257 judges whether the external device connecting signal 223 from the external device connecting interface unit 220 is "1" (step S111). When the external device connecting signal 223 is "1", i.e., when the digital camera 5 is connected to the printer 1, the CPU 257 sets the main power source output permission flag 2591 of the RAM 259 and the main power source output permission signal 283 at "1" and outputs the main power source output permission signal 283 to the main power source unit 245 (step S112). The processing returns to the main routine in FIG. 12. When receiving the value "1" as the main power source output permission signal 283 as has been described, the main power source unit 245 supplies main power source to the units in the printer unit 210. As a result, the printer unit 210 shifts from the standby mode to the fixing mode to prepare for printing or to make printing possible.

On the other hand, when the external device connecting signal 223 is "0" not "1" (when the judgement result is "N" at step S111), i.e., when the digital camera 5 is separated from the printer 1, the CPU 257 sets the main power source output permission flag 2591 and the main power source output permission signal 283 at "0" and outputs the main power source output permission signal 283 to the main power source unit 245 (step S113). The processing returns to the main routine in FIG. 12. As a result, power supplying to the printer unit 210 is stopped and the printer unit 210 shifts from the fixing mode to the standby mode or keeps the standby mode.

As has been described, when the digital camera 5 is connected to the printer 1, the main power source is supplied to the units in the printer unit 210 in the present embodiment. As a result, while the user selects a desired image by operating the camera 5 among a plurality of images that have been obtained by taking pictures and the like, the temperature of the fixing roller in the fixing unit 217 is increased, for instance. Accordingly, when the temperature of the fixing roller is increased to the fixing temperature and the printer 1 is ready for image forming during image selection by the user, image forming is started just after the image data is received from the digital camera 5. The user obtains the printed image without waiting for the fixing roller temperature to be increased to the fixing temperature. Using the conventional printer, the user has to wait the fixing roller temperature to be increased to the fixing temperature and the printer to be prepared for image forming since the standby mode is canceled only after the reception of the image data from the digital camera. According to the present invention, the problem can be solved and the user usability can be improved.

Note that although the fixing mode shifts to the standby mode just after the cable 6 is removed in the present embodiment, the fixing mode does not always shift to the standby mode immediately after the removal. For instance, when the image data that have not been printed remains in the image memory 254 and the coins necessary for image forming remains in the printing coin handling unit 304 in the coin box 3, image forming may be continued for the remaining image data and the fixing mode may be shift to the standby mode after the image forming. Also, the fixing mode may shift to the standby mode after a predetermined period of time has elapsed since the cable 6 was removed.

Figure 14:
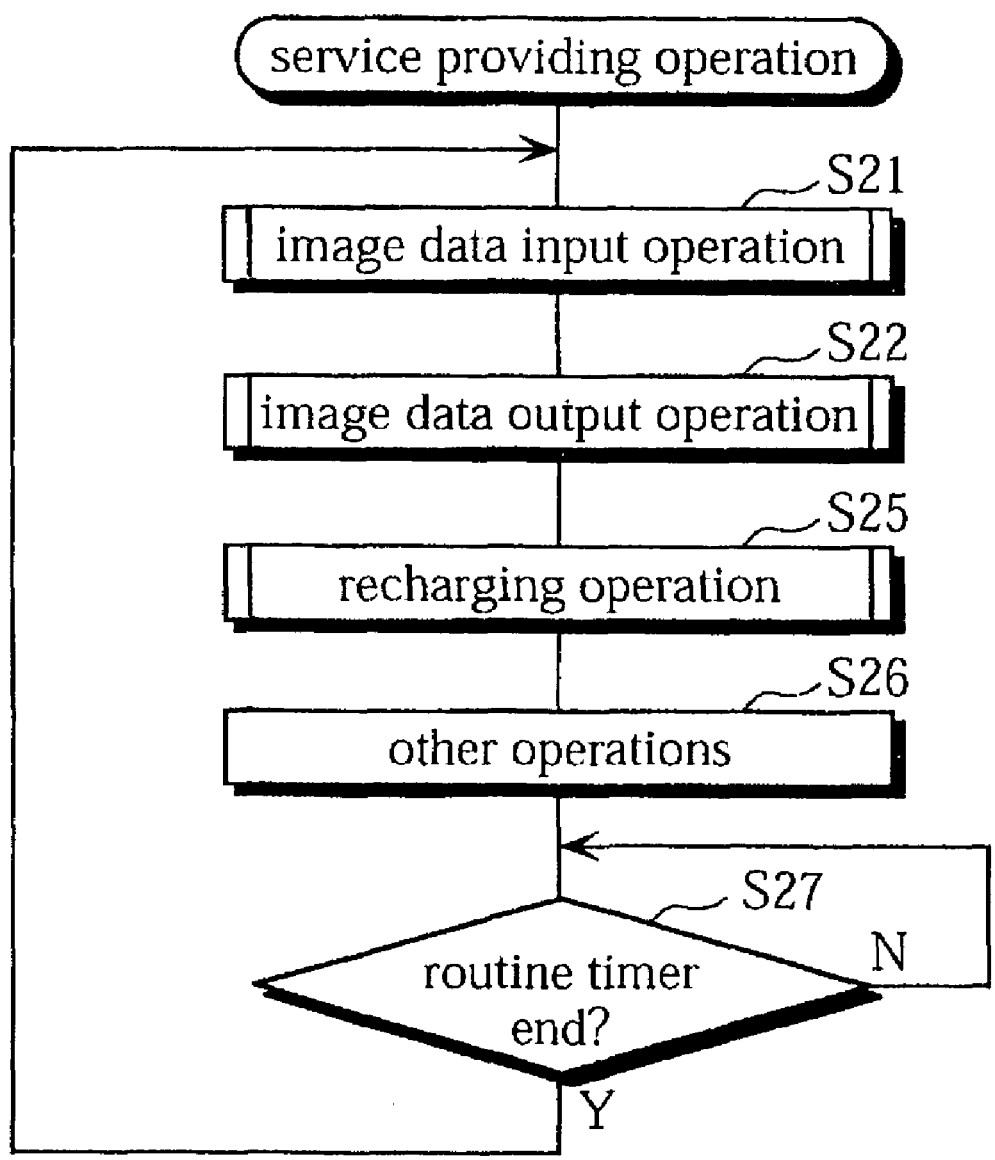
FIG. 14 is a flowchart showing the main routine of a service providing operation by the CPU in the main body control unit.

FIG. 14 is a flowchart showing the main routine of the service providing operation by the CPU 257.

When the power switch 230 is turned on and the auxiliary power from the auxiliary power source unit 243 is input into the main body control unit 250, the CPU 257 starts the routine timer to manage the time of the main routine of the service providing operation (step S27). The CPU 257 repeats an image data input operation for storing image data of colors Y to K in the image memory 254 (step S21), an image data output operation for outputting the image signals of the colors Y to K to the image forming units 213Y to 213K (step S22), a recharging operation (step S25), and operations other than the operations at steps S21, S22, S25, and S27 (step S26) in order at predetermined intervals.

Here, more-detailed explanations of the image data input operation, the image data output operation, and the recharging operation will be given in order.

Figure 15:
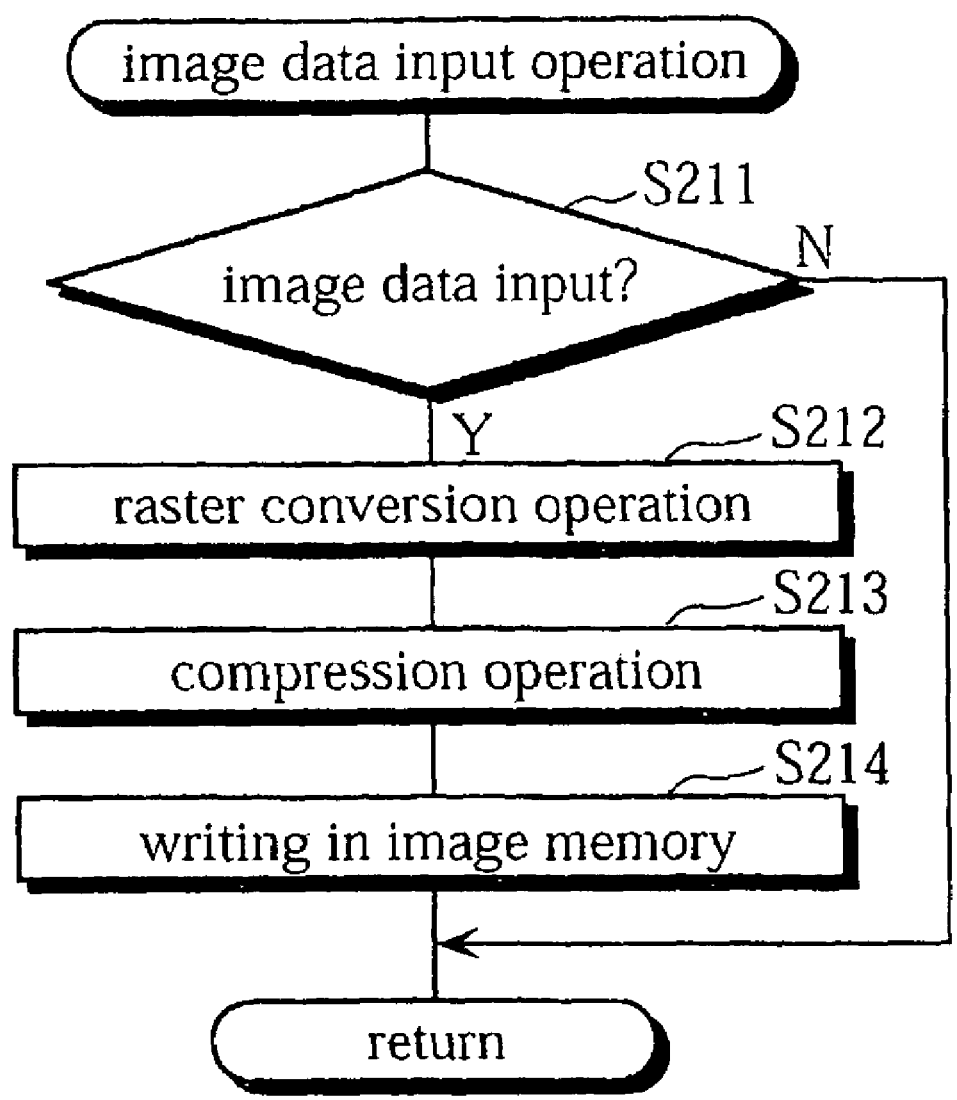
FIG. 15 is a flowchart showing the subroutine of the image data input operation in step S21 in FIG. 14.

FIG. 15 is a flowchart showing the subroutine of the image data input operation in FIG. 14 (step S21).

First, the CPU 257 judges whether image data has been input from the digital camera 5 via the interface 251 (step S211). When the image data has been input (when the judgement result is "Y" at step S211), the CPU 257 instructs the raster conversion unit 252 to execute raster conversion operation (step S212). As a result, the bit map expansion is performed on the image data of R, G, and B recharging to convert the image data of R, G, and B colors to the image data of reproductive colors of Y, M, C, and K. Then, the CPU 257 instructs the reproductive color image data to the compression/expansion unit 253 to execute compression operation to compress the image data of colors of Y, M, C, and K (step S213) and has the compressed image data of reproductive colors of Y, M, C, and K be written in the image memory (step S214). The precessing returns to the main routine in FIG. 14. On the other hand, when no image data has been input at step S211 (when the judgement result is "N" at step S211), the processing skips steps S212 to S214 and returns to the main routine in FIG. 14.

Figure 16:
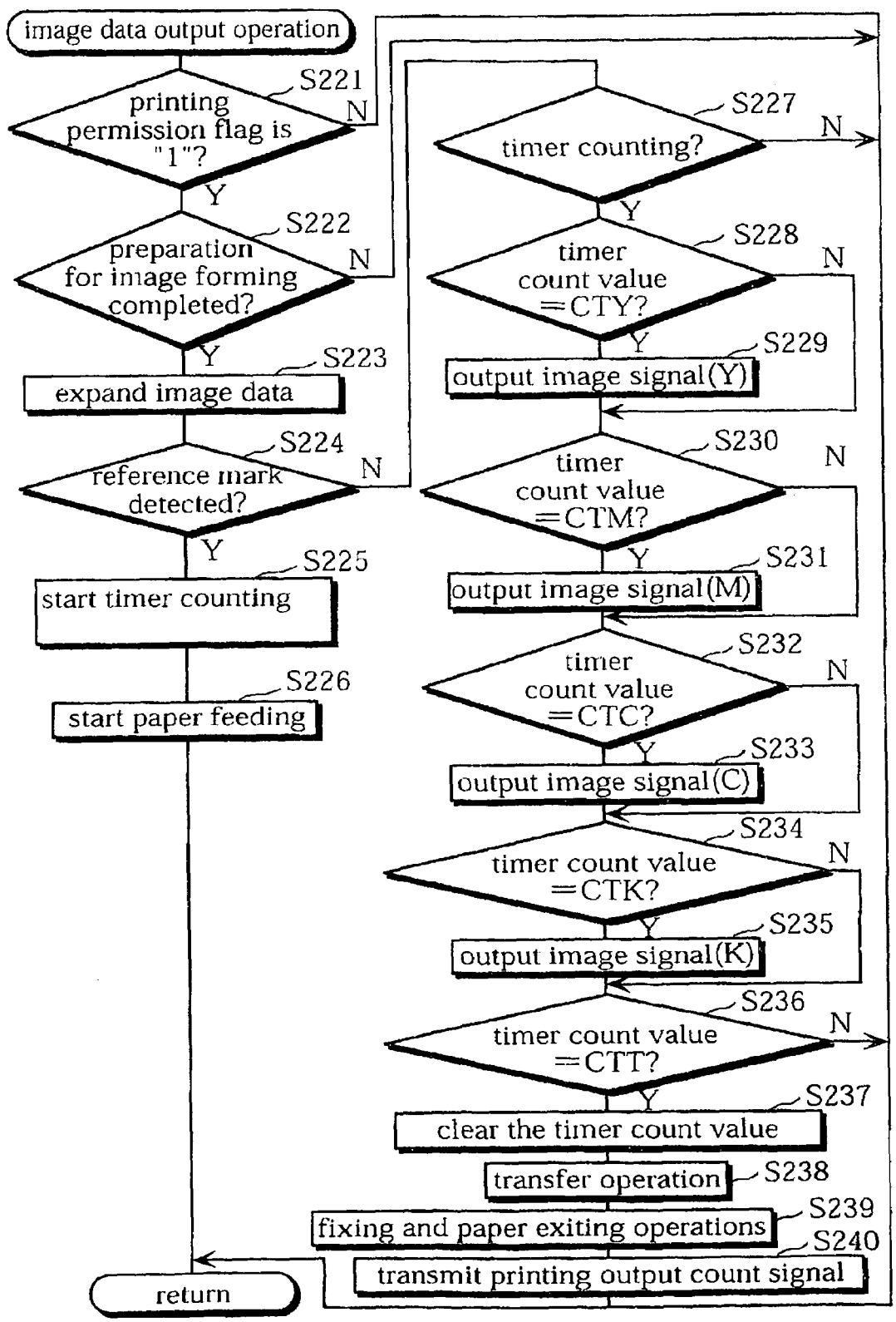
FIG. 16 is a flowchart showing the subroutine of the image data output operation in step S22 in FIG. 14.

FIG. 16 is a flowchart showing the subroutine of the image data output operation in FIG. 14 (step S22).

First, the CPU 257 judges whether the printing permission flag 2592 in the RAM 259 is "1", i.e., whether image forming is permitted (step S221). As has been described, the printing permission flag 2592 is updated by the CPU 257 according to the printing permission signal 363 from the coin box control unit 330. The printing permission flag 2592 is "1" when the coins corresponding to the amount of money for image forming remain in the printing coin handling unit 304 in the coin box 3, and "0" when the coins do not remain. When the printing permission flag 2592 is "1" (when the judgement result is "Y" at step S221), the CPU 257 judges whether the preparation for image forming has been completed, i.e., whether images can be immediately formed (step S222). This is judged by detecting whether the temperature of the fixing roller in the fixing unit 217 reached at the fixing temperature. When judging that the preparation for image forming has been completed (when the judgement result is "Y" at step S222), the CPU 257 instructs the compression/expansion unit 253 to expand the image data (step S223). As a result, the compressed image data of the colors is expanded to the original 8-bit image data. Then, the CPU 257 judges whether the reference mark on the rotating transfer belt 211 has been detected by the sensor 219 (step S224). When the reference mark has been detected (when the judgement result is "Y" at step S224), the CPU 257 starts the timer 2571 counting (step S225) and instructs the paper supplying unit 215 to start feeding the recording sheet S from the paper cassette 214 (step S226). The processing returns to the main routine in FIG. 14.

On the other hand, when no reference mark has been detected at step S224 (when the judgement result is "N" at step S224), the CPU 257 judges whether the timer 2571 is counting (step S227). When the timer is counting (when the judgement result is "Y" at step S227), the CPU 257 judges whether the count value of the timer 2571 is equal to the count value indicated as "CTY" (step S228). Here, the count value "CTY" is stored in the ROM 258 in advance and corresponds to the period of time necessary for the reference mark on the transfer belt 211 to move from the detection position by the sensor 219 to the toner transfer position T1 of the image forming unit 213Y. Note that count values CTM, CTC, and CTK at following steps are also stored in the ROM 258 in advance and correspond to the periods of time necessary for the reference mark to move from the detection position to the toner transfer positions T2, T3, and T4 of the image forming units 213M, 213C, and 213K (CTY<CTM<CTC<CTK).

The CPU 257 reads the count values CTY, CTM, CTC, and CTK from the ROM 258. When judging that the count value of the timer 2571 has become equal to the count value CTY (when the judgement result is "Y" at step S228), the CPU 258 instructs the DMA controller 255 to output the image signal (Y) (step S229). The processing advances to step S230. As a result, the toner image of color Y is transferred onto the transfer belt 211 by the image forming unit 213Y.

On the other hand, when the count value of the timer 2571 is not equal to the count value CTY, i.e., when it is judged that the count value of the timer 2571 is below or above the count value CTY (when the judgement result is "N" at step S228), the processing skips step S229 and advances to step S230. At step S230, the CPU 257 judges whether the count value of the timer 2571 has become equal to the count value CTM.

When judging that the count value of the timer 2571 has become equal to the count value CTM (when the judgement result is "Y" at step S230), the CPU 257 instructs the DMA controller 255 to output the image signal (M) (step S231). The processing advances to step S232. As a result, the toner image of color M is transferred onto the transfer belt 211 by the image forming unit 213M so as to be precisely superimposed on the toner image of color Y.

When the count value of the timer 2571 is not equal to the count value CTM, (when the judgement result is "N" at step S230), the processing skips step S231 and advances to step S232. At step S232, the CPU 257 judges whether the count value of the timer 2571 has become equal to the count value CTC.

When judging that the count value of the timer 2571 has become equal to the count value CTC (when the judgement result is "Y" at step S232), the CPU 257 instructs the DMA controller 255 to output the image signal (C) (step S233). The processing advances to step S234. As a result, the toner image of color C is transferred onto the transfer belt 211 by the image forming unit 213C so as to be precisely superimposed on the toner images of colors Y and M.

When the count value of the timer 2571 is not equal to the count value CTC (when the judgement result is "N" at step S232), the processing skips step S233 and advances to step S234. At step S234, the CPU 257 judges whether the count value of the timer 2571 has become equal to the count value CTK.

When judging that the count value of the timer 2571 has become equal to the count value CTK (when the judgement result is "Y" at step S234), the CPU 257 instructs the DMA controller 255 to output the image signal (K) (step S235). The processing advances to step S236. As a result, the toner image of color K is transferred onto the transfer belt 211 by the image forming unit 213K so as to be precisely superimposed on the toner images of colors Y to C.

Then, the CPU 257 judges whether the count value of the timer 2571 has become equal to the counter value CTT (step S236). Here, the count value CTT is stored in the ROM 258 in advance and corresponds to the period of time that has elapsed since the reference mark passed the detection position by the sensor 219 until the front end of the image forming area on the transfer belt 211 in the direction of the rotation of the transfer belt 211 reached a re-transfer position T5 on the transfer unit 216.

The CPU 257 read the value that has been stored as the count value CTT from the ROM 258. When judging that the count value of the timer 2571 has become equal to the count value CTT (when the judgement result is "Y" at step S236), the CPU 257 clears the count value of the timer 2571 to "0" (step S237) and has the transfer unit 216 execute transfer operation (step S238). Note that when the count value of the timer 2571 has become CTT, the front edge of the recording sheet S in the traveling direction reaches the re-transfer position T5 on the transfer unit 216. As a result, the front end of the image forming area on the transfer belt 211 meets the front edge of the recording sheet S in the traveling direction and the color toner images are re-transferred onto the appropriate part of the recording sheet S.

Then, the CPU 257 has the fixing unit 217 and the paper exiting unit 218 execute a fixing operation and a paper exiting operation, respectively (step S239). When the recording sheet S on which toner images have been fixed is exited, the CPU 257 transmits the printing output count signal 361 to the coin box 3 (step S240). The processing returns to the main routine in FIG. 14.

Here, the printing output count signal 361 is transmitted to the coin box 3 after the exit of the recording sheet S since the recording sheet S may be jammed in the fixing unit 217 and the paper exiting unit 218. In this case, it is not fair to make a charge for printing. Note that when the judgement result is "N" at steps S221, S222, S227, and S236, the processing returns to the main routine in FIG. 14.

Figure 17:
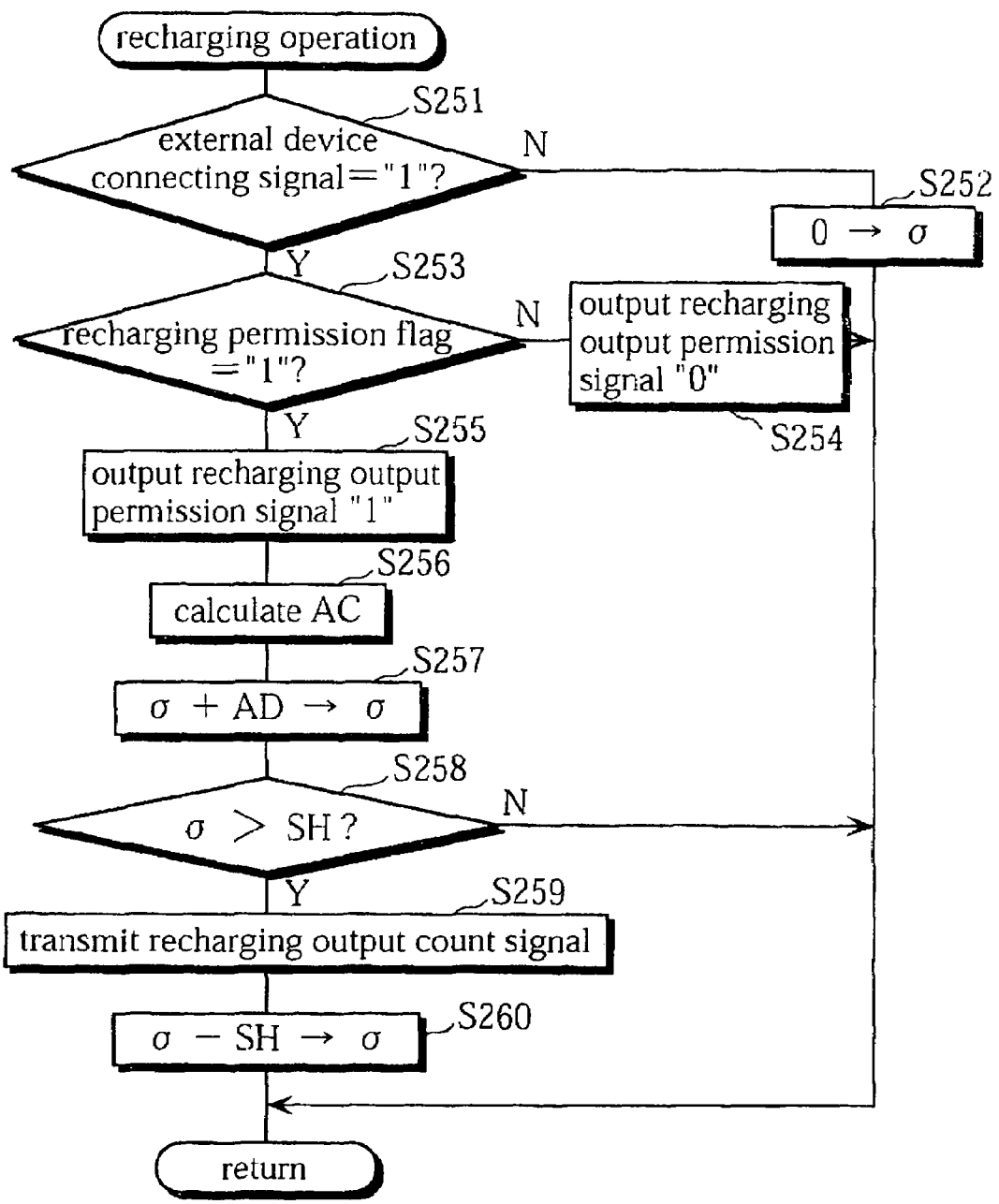
FIG. 17 is a flowchart showing the subroutine of the recharging operation in step S25 in FIG. 14.
Figure 18:
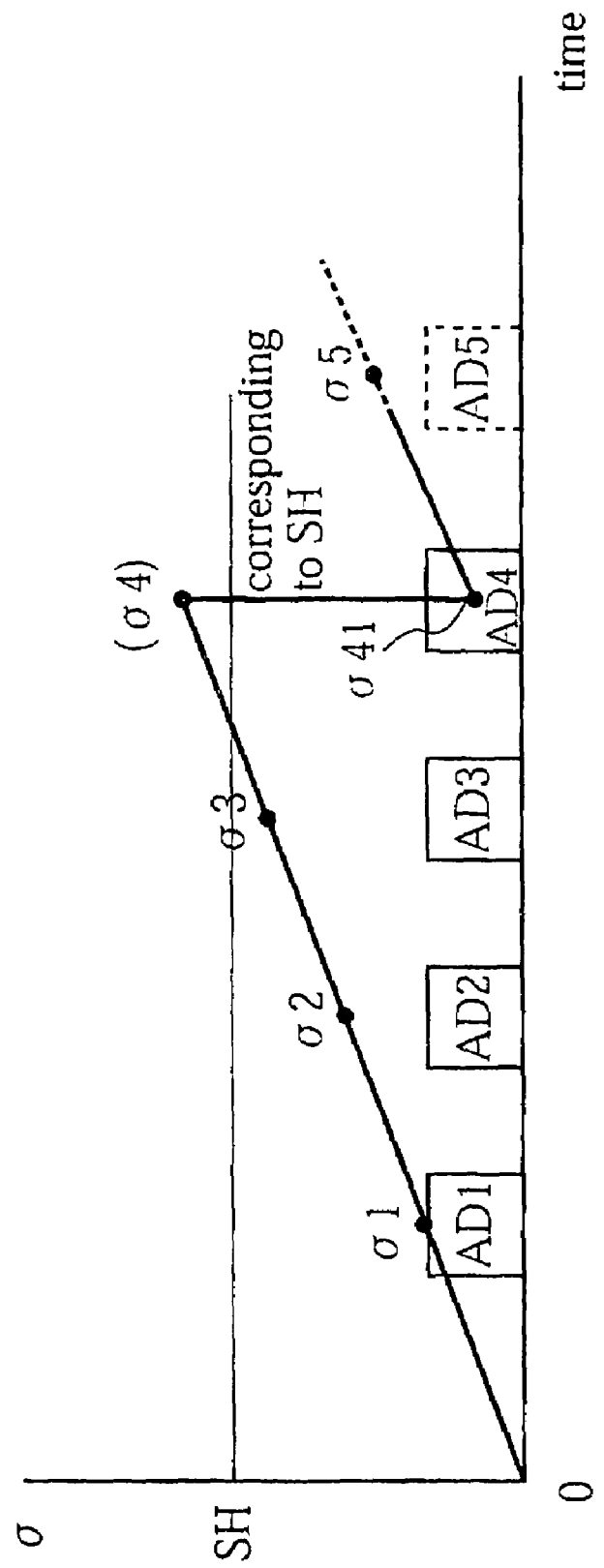
FIG. 18 shows the recharging operation in FIG. 17.

FIG. 17 is a flowchart showing the subroutine of the recharging operation in FIG. 14 (step S25) and FIG. 18 shows the recharging operation. Note that each of the AD1 to AD5 in FIG. 18 indicates the amount of current during the sampling of the recharging current value signal 282 from the recharging output control unit 244 at predetermined intervals by the CPU 257. Each of the σ1 to σ5 indicates the total integral (referred to the "recharge amount" in this specification) σ, which is obtained by adding AD1 to AD5 together.

First, the CPU 257 judges whether the external device connecting signal 223 is "1" (step S221). As has been described, the external device connecting signal 223 is transmitted from the external device connecting interface unit 220 and is "1" when the digital camera 5 is connected to the printer 1 and is "0" when the digital camera 5 is not connected.

When the external device connecting signal 223 is "0" (the judgement result is "N" at step S251), the CPU 257 clears the total integral σ, which indicates the charge amount for the digital camera 5, to "0" (step S252, refer to the origin in FIG. 18). The processing returns to the main routine in FIG. 14.

On the other hand, when the external device connecting signal 223 is "1" (the judgement result is "Y" at step S251), the CPU 257 judges whether the recharging permission flag 2593 in the RAM 258 is "1" (step S253). As has been described, the recharging permission flag 2593 is "1" (permission) when coins to be used for recharging remain in the recharging coin handling unit 314 in the coin box 3, and is "0" (prohibition) when no coins remain.

When the recharging permission flag 2593 is not "1" (when the judgement result is "N" at step S253), the CPU 257 sets the recharging output permission signal 281 at "0" and outputs the recharging output permission signal 281 to the recharging output control unit 244 (step S254). As has been described, the recharging output control unit 244 outputs no power for recharging when the recharging output permission signal 281 is "0". Accordingly, no power is supplied to the digital camera 5 in this case.

On the other hand, When the recharging permission flag 2593 is "1" (when the judgement result is "Y" at step S253), the CPU 257 sets the recharging output permission signal 281 at "1" and outputs the recharging output permission signal 281 to the recharging output control unit 244 (step S255). Since the recharging output control unit 244 outputs power for recharging when the recharging output permission signal 281 is "1", power is supplied to the digital camera 5.

Then, the CPU 257 samples the recharging current value signal 282 from the recharging output control unit 244 at regular intervals and performs the analog-digital conversion on the sampled recharging current value signal 282 to calculate the AD value (step S256, refer to AD1 to AD5 in FIG. 18). As has been described, the AD value indicates the recharge amount for the digital camera 5 during the sampling. When the AD value has been calculated, the CPU 257 adds the calculated AD value to the present total integral σ to obtain a new total integral a (step S257, refer to σ1 to σ5 in FIG. 18, for instance, σ2=σ1+AD2). The CPU judges whether the new total integral σ exceeds a predetermined threshold level SH (step S258). The threshold level SH indicates the unit of charge for a predetermined amount of supplied power.

When the new total integral σ does not exceed the threshold level SH (when the judgement result is "N" at step S258), the processing returns to the main routine in FIG. 14. On the other hand, when the new total integral a exceeds the threshold level SH (when the judgement result is "Y" at step S258), the CPU 257 transmits the recharging output count signal 362 to the coin box control unit 330 in the coin box 3 (step S259). As shown at steps S325 to S327 in FIG. 9, when receiving the recharging output count signal 362, the coin box control unit 330 makes a charge for the predetermined amount of supplied power.

After transmitting the recharging output count signal 362, the CPU 257 subtracts the threshold level SH from the total integral σ (step S260, refer to σ41 in FIG. 18). The process returns to the main routine in FIG. 14.

According to the present embodiment, when coins are put into the recharging coin slot 311 and when the count value J of the recharging coin counter 3342 is plus (J>0) (step S334), the recharging permission signal 364 "1" is transmitted from the CPU 332 in the coin box control unit 330 to the CPU 257 in the main body control unit 250 (step-S336). The CPU 257 outputs recharging output permission signal 281 "1" to the recharging output control unit 244 (step S255). As a result, DC5V is supplied to the digital camera 5 from the recharging output control unit 244 via the connector 221 and the cable 6 to recharge the secondary battery.

Then, the CPU 257 calculates the AD value, which indicates the amount the power that has been supplied for the camera 5 (step S256) and obtains the total integral σ (step S257). When the total integral σ exceeds the threshold level SH (when the judgement result is "Y" at step S258), the CPU 257 transmits the recharging output count signal 362 to the CPU 332 in the coin box 3 (step S259). The CPU 332 subtracts one from the count value J of the recharging coin counter 3342 (step S326), transmits the recharging coin drop signal 352 to the recharging coin a handling unit 314 (step S327) to make a charge for the recharge amount. Accordingly, the secondary battery can be recharged away from home and the user usability can be improved.

(Other Possible Modifications)

The explanation of the preferred embodiment of the image forming apparatus according to the present invention has been given. The present invention is not limited to the embodiment that has been described. Other possible modifications will be given below.

(1) In the preferred embodiment, it is detected by the interface controller 222 whether the digital camera 5 is connected to the printer 1. A logical circuit can detect the connection and separation of the digital camera S by the insert and remove of the cable 6. For instance, a, limit switch around the connector 221 can be set to operate according to the insertion and removal of the cable 6 to easily detect whether the digital camera 5 is connected.

(2) In the preferred embodiment, the standby mode is switched to the fixing mode after the direct connection of the cable 6 of the digital camera 5 to the external device connecting interface unit 220 is detected. The standby mode can be switched to the fixing mode in other manners. For instance, the standby mode can be switched to the fixing mode after detecting the digital camera 5 by receiving a signal from the digital camera 5 with the wireless communication. In this case, the standby mode can be switched to the fixing mode only by making the digital camera 5 closer to the printer 1, for instance. As a result, the switch to the fixing mode can be accelerated and the time that elapses before the image forming starts can be shortened. In addition, image data can be transmitted to the printer 1 with wireless communication.

(3) While the IEEE1394 interface is used as the interface unit 220 in the preferred embodiment, another interface, such as the USB (Universal Serial Bus) can be used.

(4) In the preferred embodiment, an image that is to be printed is selected among a plurality of images using operational buttons on the external device. The image can be selected on the printer main body 2. In this case, all pieces of the image data in the digital camera 5 are transmitted to the printer main body 2 and are temporarily stored in the image memory 254 after the connection of the digital camera 5.

Then, a list of all the image data in the digital camera 5 is shown on the display, for instance, an LCD (Liquid Crystal Display), according to the index display, and an image to be printed is selected.

(5) In the preferred embodiment, the printing service is provided when coins are put into the printing coin slot 301, the recharging service is provided when coins are put into the recharging coin slot 311, and the printing service and the recharging service are provided when coins are put into the printing coin slot 301 and the recharging coin slot 311. The coin box 3 can be provided with only one coin slot and selection buttons for selecting the service to be provided, and the printing service, the recharging service, or both of the services can be provided according to the operation of the button.

(6) While only coins are used for the settlement of the printing and recharging services in the preferred embodiment, bank notes can be used for the settlement. Also, the prepaid card and the electronic money system can be used. More specifically, the medium that is used as a substitute for money, for instance, the magnetic card, the IC (Integrated Circuit) card, and the optical disc, which each records information magnetically, electrically, and optically, can be used of the settlement.

In addition, the printer 1 can be connected to the network to use the credit card settlement using computer networks.

(7) While the coin box 3 is connected to the printer main body 2 via the cable 4 in the preferred embodiment, the coin box 3 can be integral with the printer main body to integrally form the main body control unit 250 and the coin box control unit 330. In this case, the number of the CPUs, ROMs, and RAMs can be cut in half and the cost can be reduced.

(8) While the external device is the digital camera in the preferred embodiment, the external device can be the PDA and the like.

(9) In the preferred embodiment, no power is supplied to the image forming units 213Y to 213K, the fixing unit 217 and the like in the printer unit 210 in the standby mode. The temperature of the fixing unit 217 can be kept lower than the fixing temperature in the standby mode and can be increased to the fixing temperature when the standby mode is switched to the fixing mode, for instance.

(10) While the tandem-type color printer in the intermediate transfer system is used in the present invention, the present invention can be used for other image forming apparatuses. For instance, the tandem-type color printer in the direct transfer system, in which the color images are transferred onto the recording sheet S by superimposing the color images on the recording sheet S, the monochrome printer, the copier, and the facsimile. In addition, the image forming apparatus according to the present invention can be used as the power supply apparatus.

Although the present invention has been fully described by way of examples with reference to the accompanying drawings, it is to be noted that various changes and modifications will be apparent to those skilled in the art. Therefore, unless such changes and modifications depart from the scope of the present invention, they should by construed as being included therein.

What is claimed is:

1. An image forming apparatus to which an external device transmitting image data is to be connected, the image forming apparatus comprising:
    a detecting unit for detecting whether the external device has been connected to the image forming apparatus, the detecting unit including a connector configured to receive a plug of a cable attached to the external device, and an interface controller connected to the connector, the interface controller outputting a first logical level signal when the plug is inserted into the connector and outputting a second logical level signal when the plug is not inserted into the connector;

a printing unit; and a control unit for controlling, in response to the first logical level signal output by the interface controller, the printing unit so as to prepare for image forming according to the image data from the external device, wherein the image data is set from the external device to the image forming apparatus via the cable.

2. An image forming apparatus comprising:

a detecting unit for detecting an external device, the external device transmitting image data, the detecting unit including a connector configured to receive a plug of a cable attached to the external device, and an interface controller connected to the connector, the interface controller outputting a first logical level signal when the plug is inserted into the connector and outputting a second logical level signal when the plug is not inserted into the connector;

a power supplying unit for supplying power;

a printing unit that is driven by the power from the power supplying unit and forms an image according to the image data from the external device; and a control unit for controlling the power supplying to the printing unit by the power supplying unit according to whether the interface controller outputs the first logical level signal or the second logical level signal, wherein the image data is set from the external device to the image forming apparatus via the cable.

3. The image forming apparatus according to claim 2, wherein the printing unit includes:

an image forming unit for forming the image on a sheet according to the image data; and a fixing unit for fixing the image on the sheet by applying heat.

4. The image forming apparatus according to claim 3, wherein the control unit controls an amount of the power supplied to the fixing unit so as to change the power amount according to whether the interface controller outputs the first logical level signal or the second logical level signal.

5. The image forming apparatus according to claim 3, wherein the control unit controls an amount of the power supplied to the fixing unit so as to keep the fixing unit at a first temperature that is lower than a second temperature for fixing the image on the sheet when the interface controller outputs the second logical level signal, and at the second temperature when the interface controller outputs the first logical level signal.

6. The image forming apparatus according to claim 2, wherein the control unit controls the power supplying to the printing unit when the interface controller outputs the first logical level signal.

7. An image forming apparatus to which an external device transmitting image data is to be connected, the image forming apparatus comprising:

a detecting unit for detecting whether the external device has been connected to the connector, the detecting unit including a connector configured to receive a plug of a cable attached to the external device, and an interface controller connected to the connector, the interface controller outputting a first logical level signal when the plug is inserted into the connector;

an image forming unit for forming an image on a sheet according to the image data that has been transmitted from the external device;

a fixing unit for fixing the image on the sheet by applying heat, wherein the fixing unit is an electric heater; and a control unit for controlling power supplying to the fixing unit according to whether the interface controller outputs the first logical level signal or the second logical level signal, wherein the image data is set from the external device to the image forming apparatus via the cable.

8. The image forming apparatus according to claim 7, wherein the external device is a camera for taking a picture and generating the image data, the external device including a connecting unit that is to be connected to the connector.

9. The image forming apparatus according to claim 7, further comprising a fee-charging unit for charging a user a fee for forming an image.

10. An image forming apparatus to which an external device transmitting image data is to be connected comprising:

a fixing unit for fixing an image that has been formed on a sheet by applying heat;

a switching unit for putting the fixing unit into a fixing mode, in which the fixing unit is kept at a first temperature for fixing the image on the sheet, and a standby mode, in which the fixing unit stands by and a temperature of the fixing unit is lower than the first temperature;

an external device detecting unit for detecting whether the external device has been connected to the image forming apparatus, the external device detecting unit including a connector configured to receive a plug of a cable attached to the external device, and an interface controller connected to the connector, the interface controller outputting a first logical level signal when the plug is inserted into the connector; and a control unit for controlling the switching unit so as to switch the fixing unit from the standby mode to the fixing mode when the interface controller outputs the first logical level signal, wherein the image data is set from the external device to the image forming apparatus via the cable.

11. The image forming apparatus according to claim 10, wherein the switching unit interrupts a current to the fixing unit in the standby mode.

12. The image forming apparatus according to claim 10, wherein the switching unit keeps the fixing unit at a second temperature, which is lower than the first temperature, in the standby mode.

13. The image forming apparatus according to claim 10, further comprising a judging unit for judging whether an image forming operation has been completed, wherein the control unit controls the switching unit so as to switch the fixing unit from the fixing mode to the standby mode when the interface controller outputs the second logical level signal and when the judging unit judges that the image forming operation has been completed.

* * * * *

UNITED STATES PATENT AND TRADEMARK OFFICE
CERTIFICATE OF CORRECTION

| | | |
|---|---|---|
| PATENT NO. | : 7,619,759 B1 | Page 1 of 1 |
| APPLICATION NO. | : 09/585339 | |
| DATED | : November 17, 2009 | |
| INVENTOR(S) | : Mishima et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2317 days.

Signed and Sealed this

Twenty-sixth Day of October, 2010

David J. Kappos
*Director of the United States Patent and Trademark Office*